(12) United States Patent
Arakane et al.

(10) Patent No.: US 11,260,671 B2
(45) Date of Patent: Mar. 1, 2022

(54) PRINTER, COMPUTER-READABLE MEDIUM, AND METHOD FOR SUPPRESSING REDUCTION IN PRINTING SPEED AND DETERIORATION OF IMAGE QUALITY

(71) Applicant: Brother Kogyo Kabushiki Kaisha, Nagoya (JP)

(72) Inventors: Satoru Arakane, Nagoya (JP); Tsuyoshi Ito, Nagoya (JP); Hirotoshi Maehira, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/096,142

(22) Filed: Nov. 12, 2020

(65) Prior Publication Data

US 2021/0162770 A1    Jun. 3, 2021

(30) Foreign Application Priority Data

Nov. 29, 2019  (JP) .............................. JP2019-217336

(51) Int. Cl.
*B41J 2/21*          (2006.01)

(52) U.S. Cl.
CPC .................. *B41J 2/2135* (2013.01)

(58) Field of Classification Search
CPC ........ B41J 2/2135; B41J 2/2132; B41J 2/205; B41J 2/2052; B41J 2/2054; B41J 2/2056; B41J 2/2121; B41J 2/2125; B41J 2/2128; B41J 2/5054; B41J 2/52; B41J 2002/2058; G06K 15/105

See application file for complete search history.

(56) References Cited

U.S. PATENT DOCUMENTS

| | | | |
|---|---|---|---|
| 2010/0007901 A1* | 1/2010 | Horii | H04N 1/506 347/14 |
| 2010/0123750 A1 | 5/2010 | Hayashi et al. | |
| 2014/0139885 A1* | 5/2014 | Nakagawa | G06K 15/107 358/3.14 |

(Continued)

FOREIGN PATENT DOCUMENTS

| | | |
|---|---|---|
| JP | 2005-205849 A | 8/2005 |
| JP | 2010-120267 A | 6/2010 |

(Continued)

*Primary Examiner* — Kristal Feggins
(74) *Attorney, Agent, or Firm* — Burr & Brown, PLLC

(57) ABSTRACT

A printer includes a print engine and a controller configured to, when a particular condition is satisfied, control the print engine to perform first partial printing to form first dots corresponding to a first portion of a target image without forming second dots corresponding to a second portion of the target image, perform sub scanning over a first distance after the first partial printing and before second partial printing, and perform the second partial printing to form the second dots without forming the first dots, and when the particular condition is not satisfied, control the print engine to perform the first partial printing to form at least a part of the first dots, perform the sub scanning over a second distance different from the first distance after the first partial printing and before second partial printing, and perform the second partial printing to form the second dots.

13 Claims, 11 Drawing Sheets

(56) References Cited

U.S. PATENT DOCUMENTS

| | | |
|---|---|---|
| 2017/0004390 A1 | 1/2017 | Matsumura et al. |
| 2019/0118550 A1* | 4/2019 | Furuta ........................ B41J 2/14 |
| 2019/0286955 A1* | 9/2019 | Hasegawa .............. B41J 2/2132 |
| 2019/0299608 A1 | 10/2019 | Maehira et al. |

FOREIGN PATENT DOCUMENTS

| | | |
|---|---|---|
| JP | 2017-013407 A | 1/2017 |
| JP | 2019-177511 A | 10/2019 |

* cited by examiner

SEPARATION PATTERN DATA

RECORDING RATE

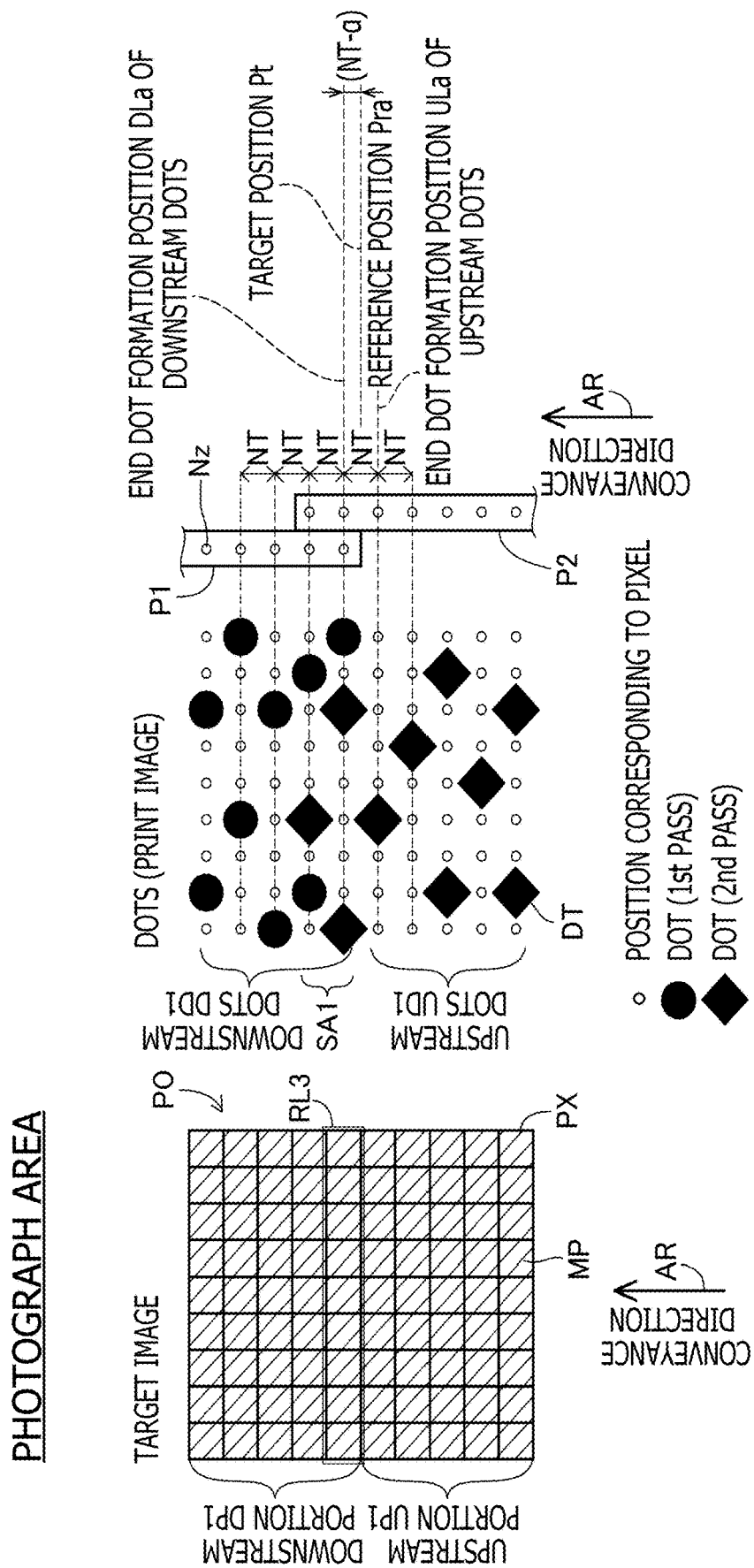

PRINTER, COMPUTER-READABLE MEDIUM, AND METHOD FOR SUPPRESSING REDUCTION IN PRINTING SPEED AND DETERIORATION OF IMAGE QUALITY

CROSS-REFERENCE TO RELATED APPLICATION

This application claims priority under 35 U.S.C. § 119 from Japanese Patent Application No. 2019-217336 filed on Nov. 29, 2019. The entire subject matter of the application is incorporated herein by reference.

BACKGROUND

Technical Field

Aspects of the present disclosure are related to a printer, a non-transitory computer-readable medium, and a method, for causing a print engine to alternately and repeatedly perform partial printing (in which the print engine forms dots on a sheet by discharging ink from a print head while performing main scanning) and sub scanning.

Related Art

A printer has been known that is configured to form an image on a sheet by performing main scanning to discharge ink onto the sheet from a print head while moving the print head relative to the sheet in a main scanning direction and performing sub scanning to convey the sheet in a sub scanning direction intersecting the main scanning direction. The printer is further configured to perform overlap printing, in which an end portion of a first area with an image formed thereon during the previous main scanning is overlapped with an end portion of a second area with an image formed thereon during the current main scanning. In the overlap area between the first area and the second area, a corresponding image is formed in both the previous main scanning and the current main scanning. When a boundary portion between the two areas has a high density, the printer performs the overlap printing to suppress banding. When the boundary portion has a low density, the printer performs printing at a higher printing speed without performing the overlap printing.

SUMMARY

However, the aforementioned known technology only suppresses the banding by performing the overlap printing, but does not provide any creative solutions to improve image quality when the overlap printing is not performed. Therefore, if the priority is given to suppressing the banding, the printing speed may be reduced. Meanwhile, if the priority is given to suppressing reduction in the printing speed, the banding may not be suppressed, and the image quality may be deteriorated.

Aspects of the present disclosure are advantageous to provide one or more improved techniques for a printer that make it possible to suppress both reduction in a printing speed and deterioration of image quality.

According to aspects of the present disclosure, a printer is provided, which includes a controller and a print engine. The print engine includes a print head having a plurality of nozzles configured to discharge ink therefrom toward a printing medium, the plurality of nozzles being disposed in respective different positions in a sub scanning direction, a main scanning device configured to perform a main scanning operation to move the print head along a main scanning direction intersecting the sub scanning direction, relative to the printing medium, and a sub scanning device configured to perform a sub scanning operation to move the printing medium in the sub scanning direction relative to the print head. The controller is configured to obtain target image data that represents a target image formed by a plurality of pixels, analyze the target image data and determine whether a particular condition is satisfied with respect to the target image, control the print engine to alternately and repeatedly perform a partial printing operation and the sub scanning operation over a plurality of times, the plurality of partial printing operations including a first partial printing operation and a second partial printing operation to be performed following the first partial printing operation, each partial printing operation being an operation in which the controller causes the print head to discharge ink from the plurality of nozzles while causing the main scanning device to perform the main scanning operation, thereby forming dots on the printing medium, when determining that the particular condition is satisfied, control the print engine to perform the first partial printing operation to form a plurality of first dots corresponding to a first portion of the target image, without forming a plurality of second dots corresponding to a second portion of the target image, the first portion being adjacent to a downstream end of the second portion in the sub scanning direction, cause the sub scanning device to perform the sub scanning operation to move the printing medium over a first distance, after the first partial printing operation and before the second partial printing operation, and perform the second partial printing operation to form the plurality of second dots, without forming the plurality of first dots, when determining that the particular condition is not satisfied, control the print engine to perform the first partial printing operation to form at least a part of the plurality of first dots, cause the sub scanning device to perform the sub scanning operation to move the printing medium over a second distance different from the first distance, after the first partial printing operation and before the second partial printing operation, and perform the second partial printing operation to form the plurality of second dots. The first distance is determined in such a manner that second end dots of the plurality of second dots are formed at a first target position. The second end dots are arranged along the main scanning direction at a downstream end portion of the plurality of second dots in the sub scanning direction. The first target position is located downstream of a reference position in the sub scanning direction. The second distance is determined in such a manner that the second end dots of the plurality of second dots are formed at a second target position. The second target position is located upstream of the first target position in the sub scanning direction. The reference position is located upstream away from first end dots of the plurality of first dots by a reference distance in the sub scanning direction. The first end dots are arranged along the main scanning direction at an upstream end portion of the plurality of first dots in the sub scanning direction. The reference distance is an interval in the sub scanning direction between any adjacent two of a plurality of dots to be formed along the sub scanning direction in each partial printing operation, and is based on an interval in the sub scanning direction between any adjacent two of the plurality of nozzles disposed along the sub scanning direction. The particular condition is satisfied when a specific index is equal to or less than a reference value. The specific index is an index regarding a difference between a color represented when the first end dots overlap the second end dots and another color represented when the first end dots do not overlap the second end dots.

According to aspects of the present disclosure, further provided is a non-transitory computer-readable medium storing computer-readable instructions executable by a processor of a printer. The printer includes a print engine that includes a print head having a plurality of nozzles configured to discharge ink therefrom toward a printing medium, the plurality of nozzles being disposed in respective different positions in a sub scanning direction, a main scanning device configured to perform a main scanning operation to move the print head along a main scanning direction intersecting the sub scanning direction, relative to the printing medium, and a sub scanning device configured to perform a sub scanning operation to move the printing medium in the sub scanning direction relative to the print head. The instructions are configured to, when executed by the processor, cause the processor to obtain target image data that represents a target image formed by a plurality of pixels, analyze the target image data and determine whether a particular condition is satisfied with respect to the target image, control the print engine to alternately and repeatedly perform a partial printing operation and the sub scanning operation over a plurality of times, the plurality of partial printing operations including a first partial printing operation and a second partial printing operation to be performed following the first partial printing operation, each partial printing operation being an operation in which the processor causes the print head to discharge ink from the plurality of nozzles while causing the main scanning device to perform the main scanning operation, thereby forming dots on the printing medium, when determining that the particular condition is satisfied, control the print engine to perform the first partial printing operation to form a plurality of first dots corresponding to a first portion of the target image, without forming a plurality of second dots corresponding to a second portion of the target image, the first portion being adjacent to a downstream end of the second portion in the sub scanning direction, cause the sub scanning device to perform the sub scanning operation to move the printing medium over a first distance, after the first partial printing operation and before the second partial printing operation, and perform the second partial printing operation to form the plurality of second dots, without forming the plurality of first dots, when determining that the particular condition is not satisfied, control the print engine to perform the first partial printing operation to form at least a part of the plurality of first dots, cause the sub scanning device to perform the sub scanning operation to move the printing medium over a second distance different from the first distance, after the first partial printing operation and before the second partial printing operation, and perform the second partial printing operation to form the plurality of second dots. The first distance is determined in such a manner that second end dots of the plurality of second dots are formed at a first target position, the second end dots are arranged along the main scanning direction at a downstream end portion of the plurality of second dots in the sub scanning direction. The first target position is located downstream of a reference position in the sub scanning direction. The second distance is determined in such a manner that the second end dots of the plurality of second dots are formed at a second target position, and the second target position is located upstream of the first target position in the sub scanning direction. The reference position is located upstream away from first end dots of the plurality of first dots by a reference distance in the sub scanning direction, the first end dots are arranged along the main scanning direction at an upstream end portion of the plurality of first dots in the sub scanning direction. The reference distance is an interval in the sub scanning direction between any adjacent two of a plurality of dots to be formed along the sub scanning direction in each partial printing operation, and is based on an interval in the sub scanning direction between any adjacent two of the plurality of nozzles disposed along the sub scanning direction. The particular condition is satisfied when a specific index is equal to or less than a reference value. The specific index is an index regarding a difference between a color represented when the first end dots overlap the second end dots and another color represented when the first end dots do not overlap the second end dots.

According to aspects of the present disclosure, further provided is a method implementable on a processor of a printer. The printer includes a print engine that includes a print head having a plurality of nozzles configured to discharge ink therefrom toward a printing medium, the plurality of nozzles being disposed in respective different positions in a sub scanning direction, a main scanning device configured to perform a main scanning operation to move the print head along a main scanning direction intersecting the sub scanning direction, relative to the printing medium, and a sub scanning device configured to perform a sub scanning operation to move the printing medium in the sub scanning direction relative to the print head. The method includes obtaining, by the controller, target image data that represents a target image formed by a plurality of pixels, analyzing the target image data and determine whether a particular condition is satisfied with respect to the target image, controlling the print engine to alternately and repeatedly perform a partial printing operation and the sub scanning operation over a plurality of times, the plurality of partial printing operations including a first partial printing operation and a second partial printing operation to be performed following the first partial printing operation, each partial printing operation being an operation in which the print head discharges ink from the plurality of nozzles while the main scanning device performs the main scanning operation, thereby forming dots on the printing medium, when determining that the particular condition is satisfied, controlling the print engine to perform the first partial printing operation to form a plurality of first dots corresponding to a first portion of the target image, without forming a plurality of second dots corresponding to a second portion of the target image, the first portion being adjacent to a downstream end of the second portion in the sub scanning direction, cause the sub scanning device to perform the sub scanning operation to move the printing medium over a first distance, after the first partial printing operation and before the second partial printing operation, and perform the second partial printing operation to form the plurality of second dots, without forming the plurality of first dots, when determining that the particular condition is not satisfied, controlling the print engine to perform the first partial printing operation to form at least a part of the plurality of first dots, cause the sub scanning device to perform the sub scanning operation to move the printing medium over a second distance different from the first distance, after the first partial printing operation and before the second partial printing operation, and perform the second partial printing operation to form the plurality of second dots. The first distance is determined in such a manner that second end dots of the plurality of second dots are formed at a first target position, the second end dots are arranged along the main scanning direction at a downstream end portion of the plurality of second dots in the sub scanning direction. The first target position is located downstream of a reference position in the sub scanning direction. The second distance is determined in such a manner that the second end dots of the plurality of second dots are formed at a second target position. The second target position is located upstream of the first target position in the sub scanning direction. The reference position is located upstream away from first end dots of the plurality of first dots by a reference distance in the sub scanning direction. The first end dots are arranged along the main scanning direction at an upstream end portion of the plurality of first dots in the sub scanning direction. The reference distance is an interval in the sub scanning direction between any adjacent two of a plurality of dots to be formed along the sub scanning direction in each partial printing operation, and is based on an interval in the sub scanning direction between any adjacent two of the plurality of nozzles disposed along the sub scanning direction. The particular condition is satisfied when a specific index is equal to or less than a reference value. The specific index is an index regarding a difference between a color represented when the first end dots overlap the second end dots and another color represented when the first end dots do not overlap the second end dots.

BRIEF DESCRIPTION OF THE ACCOMPANYING DRAWINGS

FIG. 9A shows a part of a photograph area in a target image, in the illustrative embodiment according to one or more aspects of the present disclosure.

FIG. 9B shows a part of a print image that corresponds to the photograph area shown in FIG. 9A, in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

A. Illustrative Embodiment

A-1. Configuration of Printer

Figure 1:
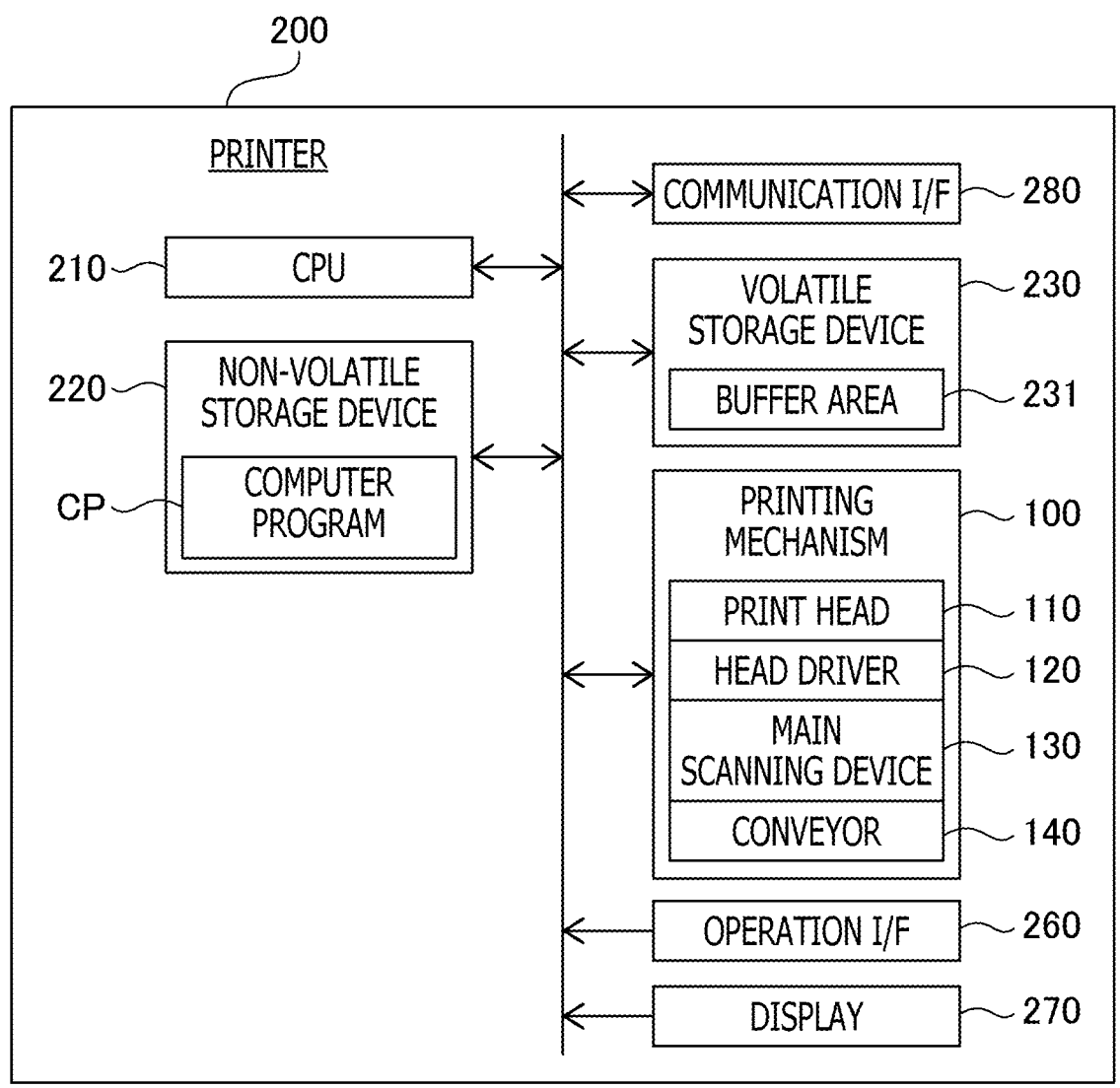
FIG. 1 is a block diagram showing a configuration of a printer in an illustrative embodiment according to one or more aspects of the present disclosure.

Hereinafter, an illustrative embodiment according to aspects of the present disclosure will be described with reference to relevant drawings. FIG. 1 is a block diagram schematically showing a configuration of a printer 200 in the illustrative embodiment.

For instance, the printer 200 includes a printing mechanism 100, a CPU 210 as a controller for the printing mechanism 100, a non-volatile storage device 220 such as a hard disk drive, a volatile storage device 230 such as a flash memory, an operation I/F ("I/F" is an abbreviation for "interface") 260 such as buttons and a touch panel for receiving user operations, a display 270 such as a liquid crystal display, and a communication I/F 280. The printer 200 is communicably connected with external devices such as user terminal devices (not shown) via the communication I/F 280.

The volatile storage device 230 provides a buffer area 231 for temporarily storing various types of intermediate data generated when the CPU 210 performs processing. The non-volatile storage device 220 stores a computer program CP. In the illustrative embodiment, the computer program CP is a control program for controlling the printer 200, and may be provided, for instance, in a form stored in the non-volatile storage device 220 when the printer 200 is shipped. In another instance, the computer program CP may be provided in a form downloadable from a server. In yet another instance, the computer program CP may be provided in a form stored on a DVD-ROM or the like. By executing the computer program CP, the CPU 210 controls the printing mechanism 100 to perform a below-mentioned printing process.

The printing mechanism 100 is configured to discharge ink droplets of cyan (C), magenta (M), yellow (Y), and black (K), thereby performing printing. The printing mechanism 100 includes a print head 110, a head driver 120, a main scanning device 130, and a conveyor 140.

Figure 2:
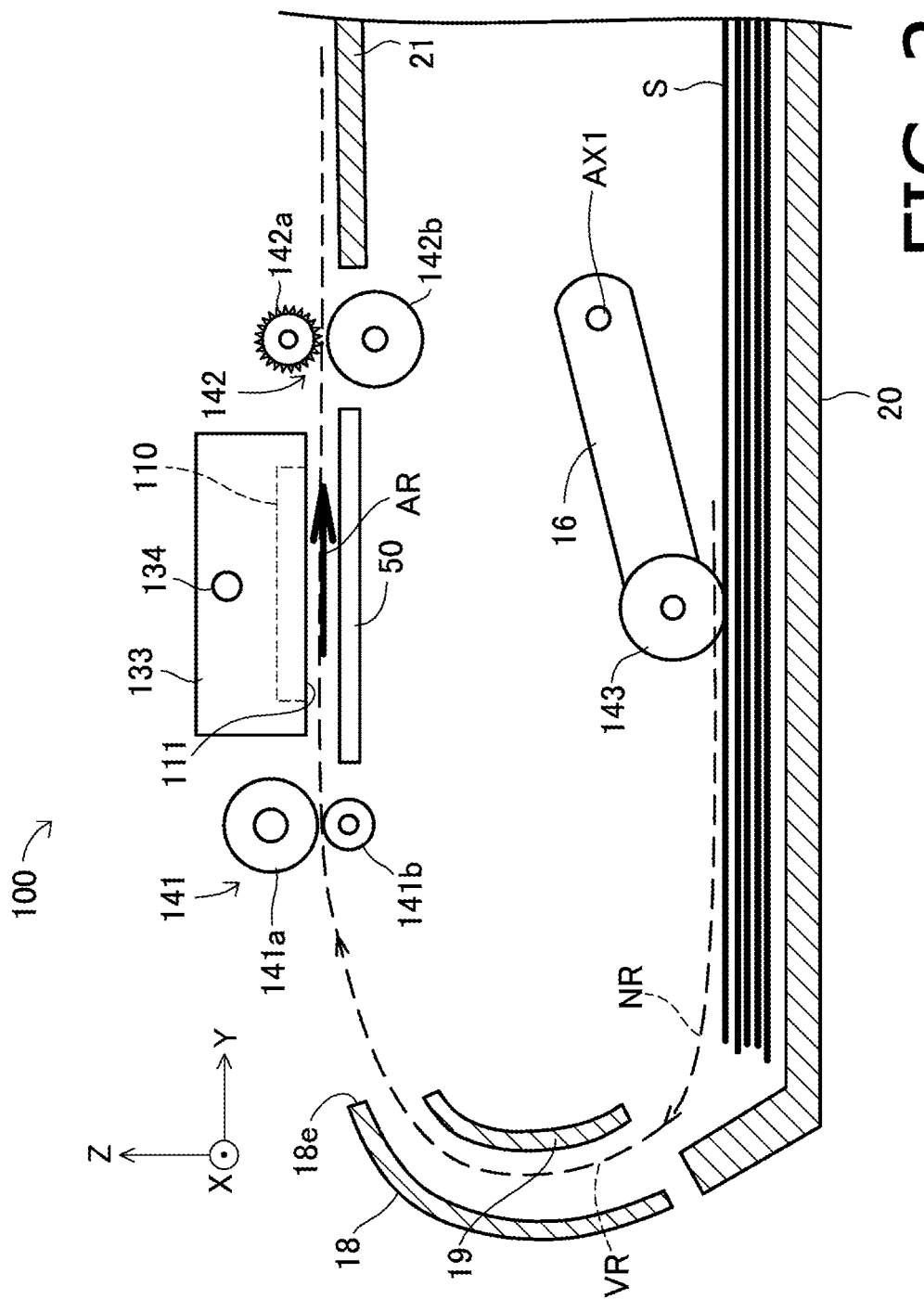
FIG. 2 is a cross-sectional view schematically showing a configuration of a printing mechanism of the printer in the illustrative embodiment according to one or more aspects of the present disclosure.

FIG. 2 illustrates a schematic configuration of the printing mechanism 100. The printing mechanism 100 further includes a feed tray 20, a discharge tray 21, and a platen 50.

The feed tray 20 is configured to support one or more sheets S (with no image printed thereon) set therein. The discharge tray 21 is configured to support one or more printed sheets S discharged thereon. The platen 50 is disposed to face a nozzle-formed surface 111 of the print head 110.

The conveyor 140 is configured to convey the sheet S along a conveyance path TR that extends from the feed tray 20, through a section between the print head 110 and the platen 50, to the discharge tray 21. The conveyance path TR includes a curved path VR, which is curved when viewed along an X direction shown in FIG. 2. The curved path VR is disposed between a below-mentioned pickup roller 143 and below-mentioned two upstream rollers 141 along the transport path TR. The X direction is perpendicular to a conveyance direction AR and parallel to a print surface of the sheet S being conveyed. Hereinafter, an upstream side of the conveyance path TR in the conveyance direction AR may be simply referred to as the "upstream side." Further, a downstream side of the conveyance path TR in the conveyance direction AR may be simply referred to as the "downstream side."

The conveyor 140 includes an outer guide member 18 and an inner guide member 19 that are configured to guide the sheet S along the conveyance path TR. The conveyor 140 further includes a pickup roller 143, two upstream rollers 141, and two downstream rollers 142 that are disposed along the conveyance path TR.

The outer guide member 18 and the inner guide member 19 are disposed along the curved path VR. The outer guide member 18 is configured to support the sheet S being conveyed in a state curved along the curved path VR, from an outer surface side (i.e., the side of the print surface) of the curved sheet S. The inner guide member 19 is configured to support the sheet S being conveyed in the state curved along the curved path VR, from the side of an inner surface side (i.e., an opposite side of the print surface) of the curved sheet S.

The pickup roller 143 is mounted at an end of an arm 16 that is rotatable around an axis AX1. The pickup roller 143 is configured to pinch the sheet S with the feed tray 20, thereby holding the sheet S. In other words, the pickup roller 143 is disposed at a location upstream of the upstream rollers 141 in the conveyance direction AR on the conveyance path TR, and holds the sheet S at the location. The pickup roller 143 separates one sheet S from the other sheet(s) S placed in the feed tray 20 and feeds the separated one sheet S to the conveyance path TR.

The two upstream rollers 141 include a driving roller 141a configured to be driven to rotate by a motor (not shown), and a driven roller 142b configured to rotate in accordance with the rotation of the driving roller 141a. Likewise, the two downstream rollers 142 include a driving roller 142a and a driven roller 142b. The driven roller 142b of the downstream rollers 142 has a plurality of thin plate-shaped spurts disposed coaxially, so as not to damage an image printed on the sheet S. For instance, the driving roller 141a, the driven roller 141b, and the driven roller 142a are cylindrical rollers.

The two upstream rollers 141 hold the sheet S at a location upstream of the print head 110 in the conveyance direction AR. The two downstream rollers 142 hold the sheet S at a location downstream of the print head 110 in the conveyance direction AR. It is noted that the conveyance direction AR shown in FIG. 2 is a direction (i.e., +Y direction) in which the sheet S is conveyed between the print head 110 and the platen 50.

The main scanning device 130 includes a carriage 133 with the print head 110 mounted thereon, and a slide shaft 134 configured to support the carriage 133 in such a manner as to enable the carriage 133 to reciprocate along the main scanning direction (i.e., for holding the carriage 133 reciprocally along the main scanning direction (i.e., an X-axis direction). The main scanning device 130 is configured to reciprocate the carriage along the slide shaft 134 using the power from a main scanning motor (not shown). Thereby, main scanning is achieved in which the print head 110 is reciprocated along the main scanning direction.

Figure 3:
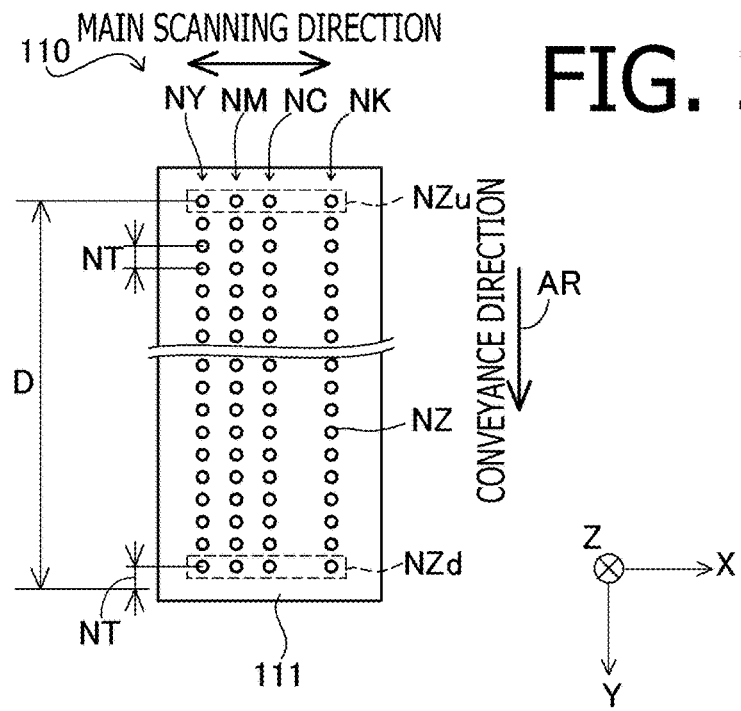
FIG. 3 shows a configuration of a print head of the printer as viewed from the −Z side (i.e., from a lower side in FIG. 2), in the illustrative embodiment according to one or more aspects of the present disclosure.

FIG. 3 shows a configuration of the print head 110 as viewed from the −Z side (i.e., from a lower side in FIG. 2). As shown in FIG. 3, in the nozzle-formed surface 111 opposed to the platen 50 of the print head 110, a plurality of nozzle rows, each of which includes a plurality of nozzles NZ, are formed. The plurality of nozzle rows include a nozzle row NC for discharging ink droplets of cyan (C), a nozzle row NM for discharging ink droplets of magenta (M), a nozzle row NY for discharging ink droplets of yellow (Y), and a nozzle row NK for discharging ink droplets of black (K). The plurality of nozzles NZ included in each nozzle row are disposed in respective different positions in the conveyance direction AR. Specifically, the plurality of nozzles NZ included in each nozzle row are arranged at particular nozzle intervals NT along the conveyance direction AR. The nozzle interval NT is a length between any two nozzles NZ, which are adjacent to each other in the conveyance direction AR, among the plurality of nozzles NZ in each nozzle row. Among the plurality of nozzles NZ included in each nozzle row, a nozzle NZ positioned upstream (i.e., at the −Y side) of any other nozzles in the conveyance direction AR may be referred to as a "most upstream nozzle NZu." Further, among the plurality of nozzles NZ included in each nozzle row, a nozzle NZ positioned downstream (i.e., at the +Y side) of any other nozzles in the conveyance direction AR may be referred to as a "most downstream nozzle NZd." A length of the nozzle interval NT added to a distance between the most upstream nozzle NZu and the most downstream nozzle NZd in the conveyance direction AR may be referred to as a "nozzle length D."

The head driver 120 is configured to drive the print head 110 that is reciprocated by the main scanning device 130 on the sheet S being conveyed by the conveyor 140. Accordingly, the print head 110 discharges ink from the plurality of nozzles NZ of the print head 110, thereby forming dots on the sheet S. Thus, an image is printed on the sheet S.

A-2. Printing Process

Figure 4:
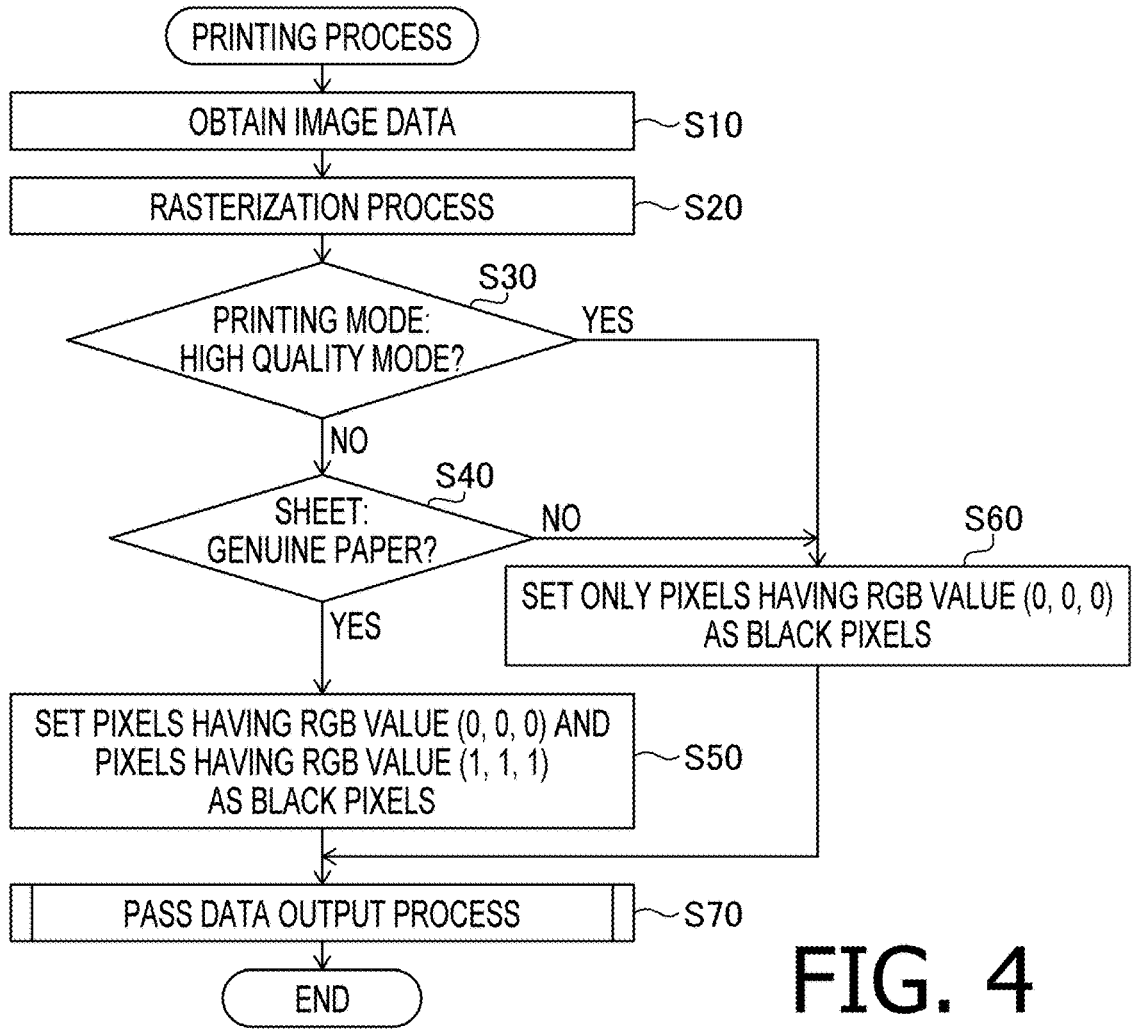
FIG. 4 is a flowchart showing a procedure of a printing process in the illustrative embodiment according to one or more aspects of the present disclosure.

The CPU 210 (see FIG. 1) of the printer 200 performs a printing process based on a print instruction from the user. The print instruction includes information for specifying image data representing an image to be printed. FIG. 4 is a flowchart showing a procedure of the printing process. In S10, the CPU 210 obtains the image data specified by the print instruction, from an external device or the volatile storage device 230. Examples of the image data may include, but are not limited to, image data in various types of formats, such as JPEG compressed image data and image data described in a page description language.

In S20, the CPU 210 performs a rasterization process for the obtained image data, thereby generating RGB image data in which a color of each pixel is represented by a corresponding RGB value. Thereby, the RGB image data is obtained as target image data in the illustrative embodiment. For instance, the RGB value is a color value containing respective component values of three colors, i.e., red (R), green (G) and blue (B). In other words, the RGB value is represented by a set of the RGB component values.

In S30, the CPU 210 determines whether a printing mode to be used is a high speed mode or a high quality mode. The high quality mode is a printing mode that requires a higher level of quality with a lower printing speed than the high speed mode. A selection instruction for selecting one of the printing modes is input by the user via the operation I/F 260. Information representing the selection instruction may be included, for instance, in the print instruction. For instance, in the high quality mode, a resolution (i.e., a density of dots) in the main scan direction is made higher than in the high speed mode. Therefore, in the high quality mode, a speed of the main scanning is made lower than in the high speed mode. Further, for instance, the high quality mode may be a mode in which the resolution in a sub scanning direction (i.e., the conveyance direction AR) is partially increased by partially performing interlace printing (multi-pass printing) to achieve a higher level of image quality at a lower printing speed than in the high speed mode.

When determining that the printing mode is the low speed mode (S30: No), the CPU 210 identifies the type of a sheet S used for printing and determines whether the sheet S is genuine paper (S40). The type of the sheet S is identified, for instance, based on sheet information previously input by the user. For instance, the genuine paper is provided by a manufacturer of the printer 200 and has properties suitable for printing by the printer 200. In contrast, sheets (e.g., recycled paper and a sheet provided by a third party different from the manufacturer of the printer 200) different from the genuine paper may not have properties suitable for printing by the printer 200. For instance, a sheet different from the genuine paper is more likely to allow ink Ik to penetrate the inside of the sheet and is less likely to keep the ink Ik left on a surface of the sheet, than the genuine paper. Therefore, a color of an image to be printed on the sheet different from the genuine paper based on particular print data is paler than a color of an image to be printed on the genuine paper based on the same particular print data.

When determining that the sheet S used for printing is the genuine paper (S40: Yes), the CPU 210 sets pixels having an RGB value of (0, 0, 0) and pixels having an RGB value of (1, 1, 1) as pixels (hereinafter, which may be referred to as "black pixels") representing black color (S50).

When determining that the printing mode is the high quality mode (S30: Yes) and that the sheet S used for printing is different from the genuine paper (S40: No), the CPU 210 sets only pixels having an RGB value of (0, 0, 0) as the black pixels (S60).

The setting of the black pixels in S50 or S60 is used in a below-mentioned pass data output process.

In S70, the CPU 210 performs a pass data output process using the RGB image data (i.e., the target image data). Specifically, the CPU 210 generates data (i.e., pass data) for a single partial printing operation SP (which will be described below and may be simply referred to as "partial printing SP") among dot data, and outputs the pass data with various types of control data added thereto, to the printing mechanism 100. The various types of control data include data for specifying a conveyance distance over which the sheet S is to be conveyed after the partial printing operation SP. In the pass data output process, as will be described in detail later, the CPU 210 outputs a plurality of pieces of pass data corresponding to a plurality of partial printing operations SP, to the printing mechanism 100.

Thereby, the CPU 210 causes the printing mechanism 100 to print a print image PI. Specifically, by outputting the plurality of pieces of pass data to the printing mechanism 100, the CPU 210 controls the head driver 120, the main scanning device 130, and the conveyor 140 so as to alternately and repeatedly perform the partial printing SP and sheet conveyance T over a plurality of times. In the single partial printing operation SP, the CPU 210 causes the print head 110 to discharge ink droplets from the nozzles NZ onto the sheet S statically placed on the platen 50 while performing a single main scanning operation, thereby forming on the sheet S a plurality of dots to form a part of the print image PI. A single sheet conveyance operation T (which may be simply referred to as "sheet conveyance T") is an operation of conveying the sheet S over a particular conveyance distance in the conveyance direction AR. In the illustrative embodiment, the CPU 210 causes the printing mechanism 100 to perform the partial printing SP over m times ("m" is an integer equal to or more than 2). In other words, the CPU 210 causes the printing mechanism 100 to perform m partial printing operations SP from partial printing SP1 to partial printing SPm.

Figure 5:
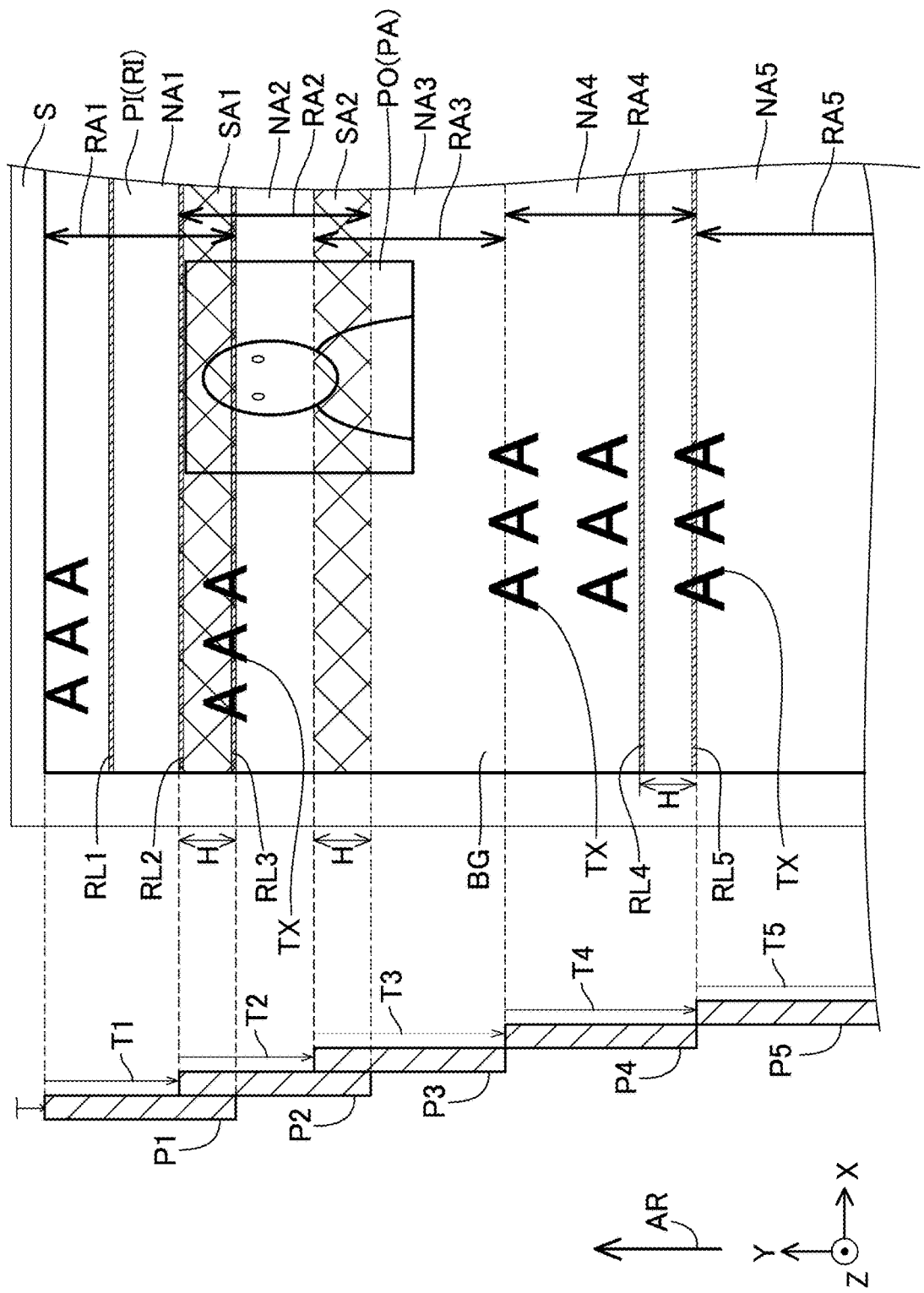
FIG. 5 shows an example of a print image in the illustrative embodiment according to one or more aspects of the present disclosure.

FIG. 5 shows an example of the print image PI in the illustrative embodiment. The print image PI in FIG. 5 is an image formed by dots. The print image PI is an image to be printed based on the target image data (i.e., the RGB image data). Hence, the print image PI in FIG. 5 may be referred to as a "target image RI." The target image RI is an image formed by a plurality of pixels. As shown in FIG. 5, the target image RI includes a plurality of texts TX, a photograph PO, and a white background BG.

FIG. 5 shows a sheet S on which the print image PI is printed. Further, FIG. 5 shows a head position P (i.e., a position of the print head 110 relative to the sheet S in the conveyance direction AR) for each partial printing SP (i.e., for each main scanning). A pass number k ("k" is an integer equal to or more than 1 and equal to or less than m) is assigned to each of the plurality of partial printing operations SP in accordance with an execution order in which the plurality of partial printing operations SP are sequentially executed. In this case, the k-th partial printing operation SP may be referred to as the "partial printing (operation) SPk." Further, the head position P where the partial printing SPk is performed may be referred to as a "head position Pk." Furthermore, the sheet conveyance T performed between the k-th partial printing SPk and the (k+1)-th partial printing SP(k+1) may be referred to as the k-th "sheet conveyance (operation) Tk." FIG. 5 illustrates the head positions P1 to P5 and the sheet conveyance operations T1 to T5, corresponding to the first to fifth partial printing operations SP1 to SP5, respectively. Moreover, an area printable in the partial printing SPk may be referred to as an "partial area RAk." FIG. 5 illustrates the partial areas RA1 to RA5 corresponding to the partial printing operations SP1 to SP5, respectively.

In FIG. 5, the print image PI to be formed on the sheet S includes a plurality of one-pass areas NA1 to NA5 (unhatched in FIG. 5) and a plurality of overlap areas SA1 and SA2 (hatched in FIG. 5, which may be referred to as "two-pass areas"). A length H of each of the overlap areas SA1 and SA2 in the conveyance direction AR is, for instance, a length of 5 to 10 pixels in the target image RI.

The dots in each of the one-pass areas NA1 to NA5 are formed in a single partial printing operation SP. Specifically, the dots in the one-pass area NAk are formed only in the k-th partial printing SPk, i.e., the partial printing SPk performed at the head position Pk.

The dots in each of the overlap areas SA1 and SA2 are formed in two partial printing operations SP. Specifically, the dots in the overlap region SAk are formed in the k-th partial printing SPk and the (k+1)-th partial printing SP(k+1). Namely, the dots in the overlap region SAk are formed in the partial printing SPk performed at the head position Pk and the partial printing SP(k+1) performed at the head position P(k+1).

In the example shown in FIG. 5, the overlap area SA1 is placed between the two one-pass areas NA1 and NA2. Likewise, the overlap area SA2 is placed between the two one-pass areas NA2 and NA3. There are no overlap areas SA placed between the two one-pass areas NA3 and NA4 and between the two one-pass areas NA4 and NA5. The pass data output process (see S70 in FIG. 4) for achieving such printing will be described.

Figure 6A:
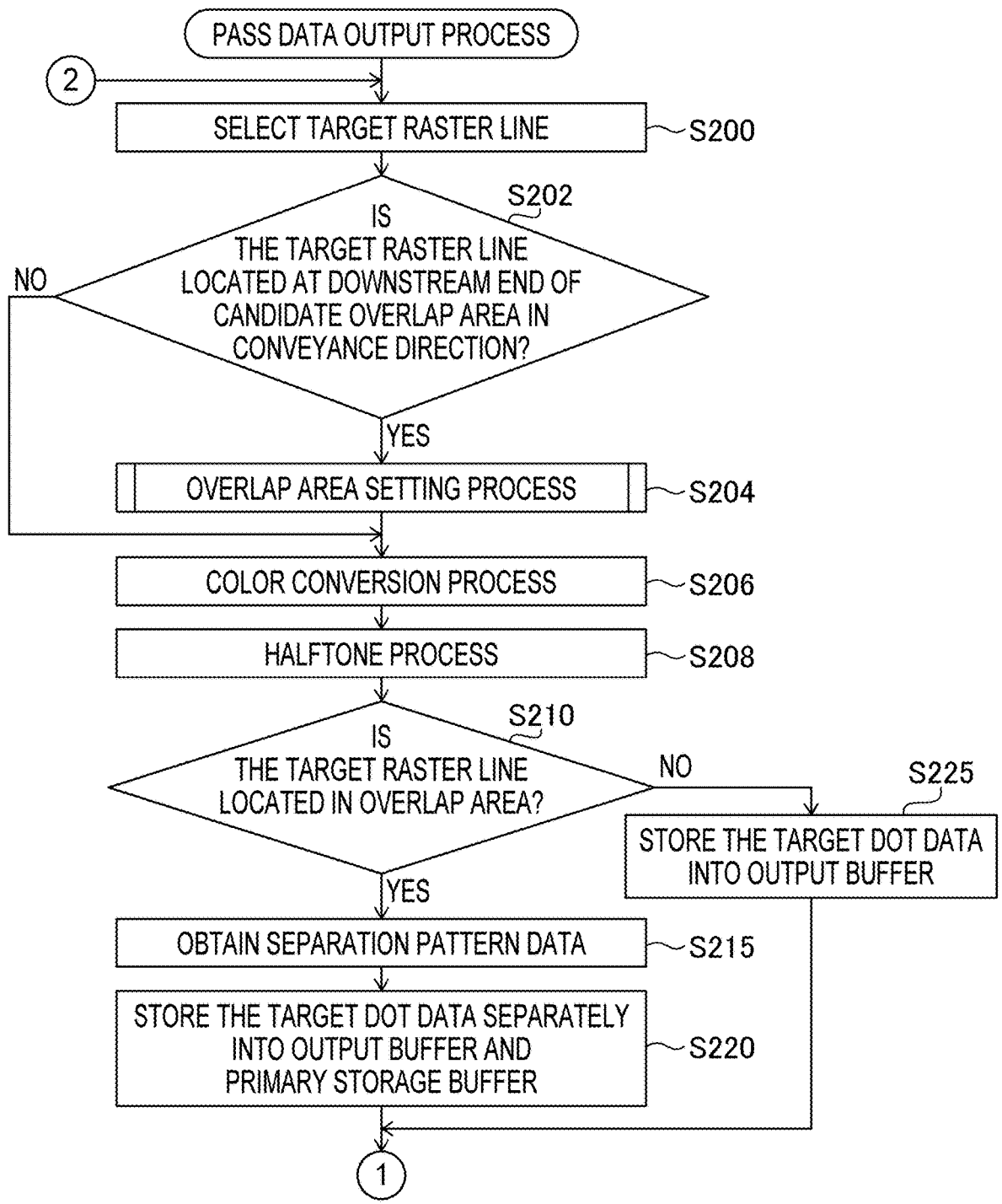
FIGS. 6A and 6B are flowcharts showing a procedure of a pass data output process in the illustrative embodiment according to one or more aspects of the present disclosure.
Figure 6B:
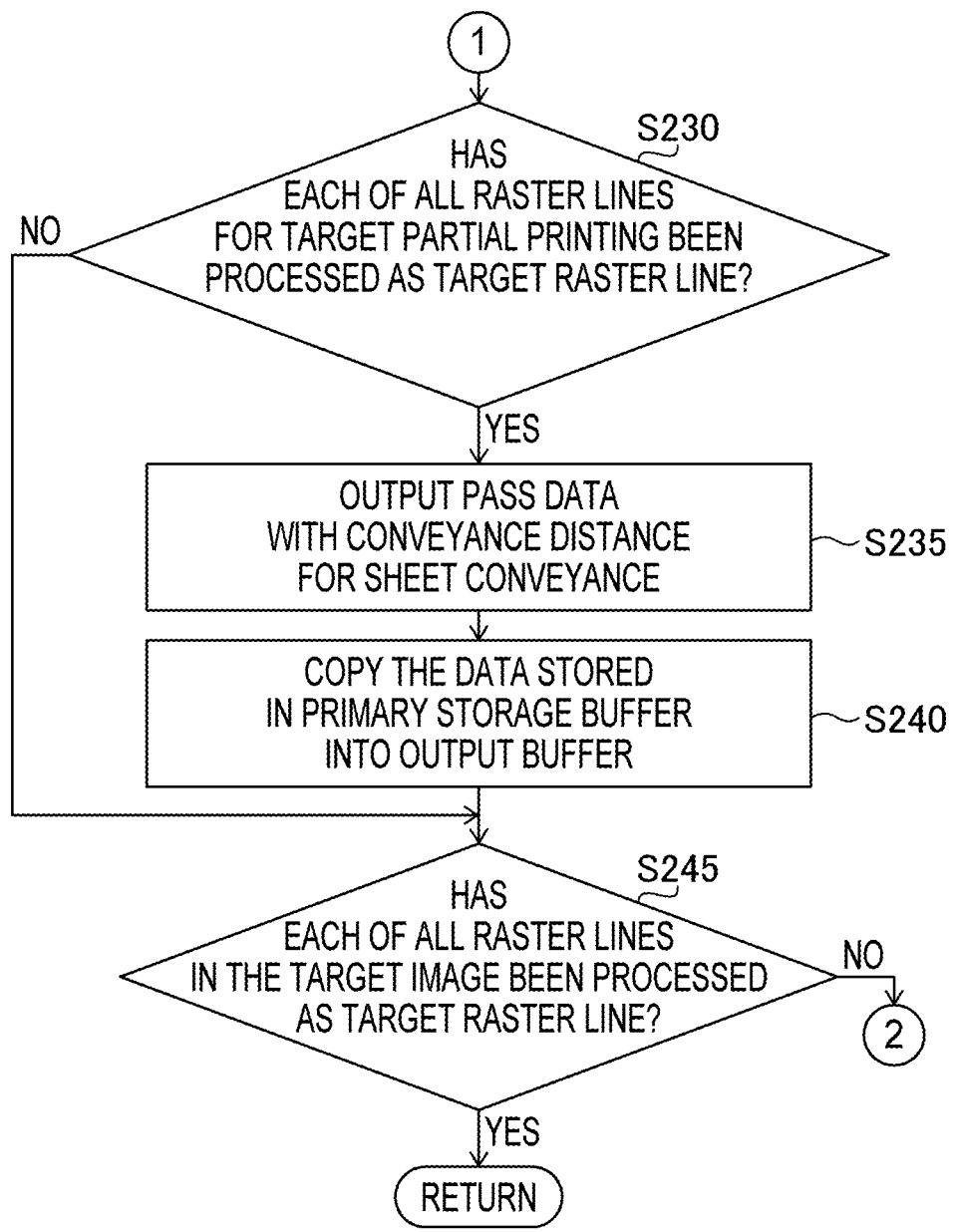

FIGS. 6A and 6B are flowcharts showing a procedure of the pass data output process. The target image RI (see FIG. 5) represented by the RGB image data (i.e., the target image data) generated in S20 includes a plurality of raster lines RL. Here, in a two-dimensional coordinate system for the target image RI, a vertical direction in FIG. 5 corresponds to the conveyance direction AR in printing of the target image RI, and a horizontal direction in FIG. 5 corresponds to the main scanning direction in printing of the target image RI. Hence, the vertical direction in the target image RI represented by the target image data may be referred to as the conveyance direction in the target image RI. Further, the horizontal direction in the target image RI may be referred to as the main scanning direction in the target image RI. It is noted that, in the following description, a downstream side (i.e., an upper side in FIG. 5) in the conveyance direction AR may be simply referred to as a "downstream side." Further, an upstream side (i.e., a lower side in FIG. 5) in the conveyance direction AR may be simply referred to as an "upstream side."

Each raster line RL is a line extending along the main scan direction, such as raster lines RL1 to RL5 in FIG. 5. Each raster line includes a plurality of pixels. In S200, the CPU 210 selects one of the plurality of raster lines RL as a target raster line. Specifically, from among the plurality of raster lines RL, the target raster line is sequentially selected on a one-by-one basis in an order from the downstream side to the upstream side in the conveyance direction AR (i.e., from the upper side to the lower side in FIG. 5). Here, the partial printing SP for forming the dots corresponding to the target raster line may be referred to as the "target partial printing." However, when the target raster line is printed in two partial printing operations SP, i.e., when the target raster line is located in an overlap area SA, a partial printing operation SP to be earlier performed, of the two partial printing operations SP, is set as the target partial printing. For instance, when one of the raster lines RL1 to RL3 is the target raster line, the target partial printing is the partial printing SP1 to be performed at the head position P1. An area printable in the target partial printing may be referred to as a "target partial area." When the target partial printing is the partial printing SP1, the target partial area is the partial area RA1.

In S202, the CPU 210 determines whether the target raster line is located at a downstream end of a candidate overlap area in the conveyance direction AR. In the illustrative embodiment, as described above with reference to FIG. 5, an overlap area may or may not be set at an upstream end portion of the target partial area in the conveyance direction AR. The candidate overlap area is an area to be set as an overlap area when it is determined to set the overlap area at the upstream end portion of the target partial area in the conveyance direction AR. Namely, the candidate overlap area is a strip-shaped area that includes the upstream end of the target partial area and has the length H in the conveyance direction AR. For instance, when the target raster line is one of the raster lines RL2 and RL4 in FIG. 5, the target raster line is determined to be located at a downstream end of a candidate overlap area in the conveyance direction AR (S202: Yes).

When determining that the target raster line is located at a downstream end of a candidate overlap area in the conveyance direction AR (S202: Yes), the CPU 210 performs an overlap area setting process (S204). In the overlap area setting process, the CPU 210 determines whether to set an overlap area to be printed in the target partial printing and the partial printing SP to be performed next. Further, in the overlap area setting process, the CPU 210 determines a conveyance distance for the sheet conveyance T to be performed immediately after the target partial printing, according to a result of the above determination as to whether to set an overlap area to be printed in the target partial printing and the partial printing SP to be performed next. When determining that the target raster line is not located at a downstream end of a candidate overlap area in the conveyance direction AR (S202: No), the CPU 210 skips the overlap area setting process of S204.

Figure 7:
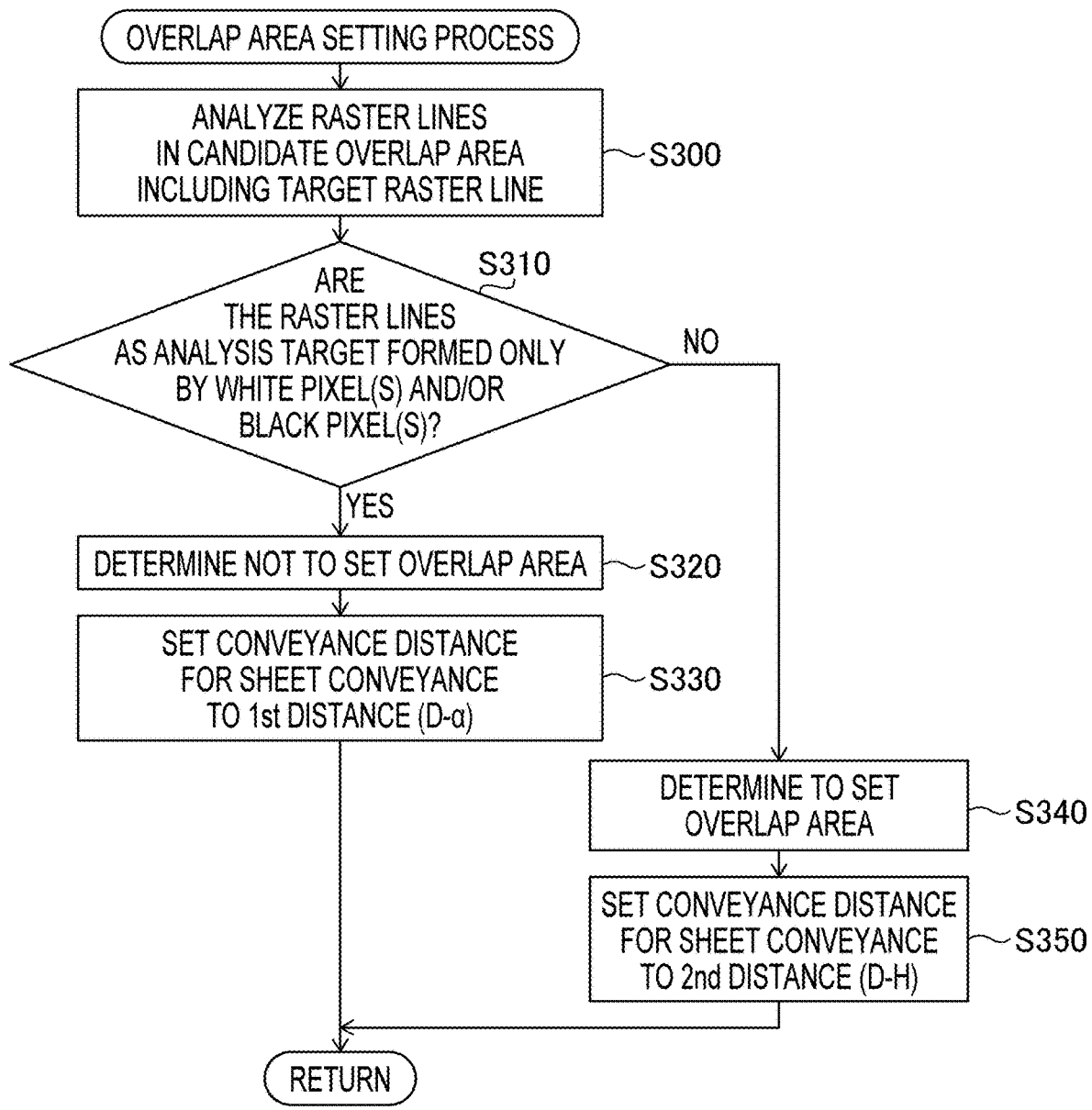
FIG. 7 is a flowchart showing a procedure of an overlap area setting process in the illustrative embodiment according to one or more aspects of the present disclosure.

FIG. 7 is a flowchart showing a procedure of the overlap area setting process. In S300, the CPU 210 analyzes a plurality of raster lines RL in the candidate overlap area including the target raster line. For instance, if the target raster line is the raster line RL2 in FIG. 5, the CPU 210 analyzes a plurality of raster lines RL from the raster line RL2 to the raster line RL3. If the target raster line is the raster line RL4 in FIG. 5, the CPU 210 analyzes a plurality of raster lines RL from the raster line RL4 to the raster line RL5.

In S310, the CPU 210 determines whether the plurality of raster lines RL as the analysis target are formed only by white pixel(s) and/or black pixel(s). The white pixel represents white color and has an RGB value of (255, 255, 255). The black pixel is set in S50 or S60 (see FIG. 4). As described above, when set in S50, the black pixel may have an RGB value of (0, 0, 0) or an RGB value of (1, 1, 1). Meanwhile, when set in S60, the black pixel has only an RGB value of (0, 0, 0).

If the plurality of raster lines RL as the analysis target include a portion representing the photograph PO (see FIG. 5), the plurality of raster lines RL as the analysis target are not formed only by white pixel(s) and/or black pixel(s). This is because, in general, the photograph PO contains pixels of various colors. Therefore, when the plurality of raster lines RL as the analysis target are the plurality of raster lines RL from the raster line RL2 to the raster line RL3 in FIG. 5, it is determined that the plurality of raster lines RL as the analysis target are not formed only by white pixel(s) and/or black pixel(s).

If the plurality of raster lines RL as the analysis target include only a portion representing a black text TX and a portion representing the white background BG, the plurality of raster lines RL as the analysis target may be formed only by white pixel(s) and/or black pixel(s). This is because, in general, the black text TX is formed only by black pixels, and the white background BG is formed only by white pixels. Therefore, when the plurality of raster lines RL as the analysis target are the plurality of raster lines RL from the raster line RL4 to the raster line RL5 in FIG. 5, it is determined that the plurality of raster lines RL as the analysis target are formed only by white pixel(s) and/or black pixel(s).

When determining that the plurality of raster lines RL as the analysis target are formed only by white pixel(s) and/or black pixel(s) (S310: Yes), the CPU 210 determines not to set an overlap area at the upstream end portion of the target partial area (S320). In this case, in S330, the CPU 210 sets, to a first distance (D−α), the conveyance distance for the sheet conveyance T to be performed immediately after the target partial printing. The first distance is equal to a length obtained by subtracting α from the aforementioned nozzle length D (see FIG. 3). It is noted that α is an adjustment length, for instance, about 0.2 to 2 times as long as the nozzle interval NT. In the illustrative embodiment, a is 0.5 times as long as the nozzle interval NT.

When determining that the plurality of raster lines RL as the analysis target are not formed only by white pixel(s) and/or black pixel(s) (S310: No), the CPU 210 determines to set an overlap area at the upstream end portion of the target partial area (S340). Namely, the aforementioned candidate overlap area having the length H in the conveyance direction AR is set as an overlap area. In this case, in S350, the CPU 210 sets, to a second distance (D−H), the conveyance distance for the sheet conveyance T to be performed immediately after the target partial printing. The second distance is equal to a length obtained by subtracting the length H of the overlap area in the conveyance direction AR from the aforementioned nozzle length D (see FIG. 3). For instance, in the illustrative embodiment, the length H of the overlap area in the conveyance direction AR is a length of 6 pixels. A length of one pixel is equal to the nozzle interval NT. Therefore, in the illustrative embodiment, the length H is expressed as "H=(6×NT)." The length H is longer than the aforementioned adjustment length α. Hence, the second distance (D−H) is shorter than the first distance (D−α).

When one of the steps S330 and S350 is executed, the overlap area setting process is terminated. For instance, as shown in the example of FIG. 5, the photograph PO straddles both of the partial areas RA1 and RA2, and straddles both of the partial areas RA2 and RA3. Therefore, the overlap area SA1 is set between the partial areas RA1 and RA2. Further, the overlap area SA2 is set between the partial areas RA2 and RA3. Meanwhile, only a text TX and the background BG straddle both of the partial areas RA3 and RA4, and straddle both of the partial areas RA4 and RA5. Therefore, no overlap areas are set between the partial areas RA3 and RA4 and between the partial areas RA4 and RA5. Thus, in the example shown in FIG. 5, the conveyance distance for the sheet conveyance operations T1 and T2 is the second distance (D−H), and the conveyance distance for the sheet conveyance operations T3 and T4 is the first distance (D−α).

Referring back to FIGS. 6A and 6B, in S206, the CPU 210 performs a color conversion process for the target raster line. The color conversion process is a process to convert the RGB values of the plurality of pixels included in the target raster line into CMYK values. The CMYK value is a color value including component values (i.e., respective component values of C, M, Y, and K) corresponding to the ink Ik used for printing. For instance, the color conversion process is performed with reference to a known lookup table.

In S208, the CPU 210 performs a halftone process for the color-converted target raster line. The halftone process is a process to convert the CMYK values of the plurality of pixels included in the target raster line into dot data. The dot data represents a dot formation state of each pixel with respect to each of the respective color components of C, M, Y, and K. For instance, a value of each pixel in the dot data represents the dot formation state in two degrees of "no dot" and "with dot" or in four degrees of "no dot," "small," "medium," and "large." The halftoning process is performed using known techniques such as a dither method and an error diffusion method.

In S210, the CPU 210 determines whether the target raster line is located in the overlap area SA. In the overlap area line setting process of the aforementioned step S204, when an overlap area SA is set in the target partial area, the target raster line may be located in the overlap area SA. Meanwhile, in the overlap area setting process, when an overlap area SA is not set in the target partial area, the target raster line is never located in the overlap area SA.

Figure 8A:
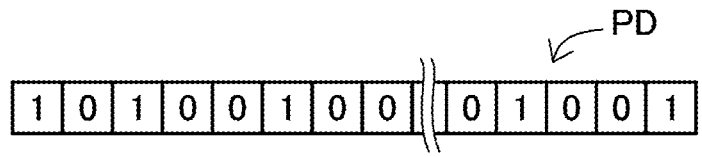
FIG. 8A shows separation pattern data in the illustrative embodiment according to one or more aspects of the present disclosure.
Figure 8B:
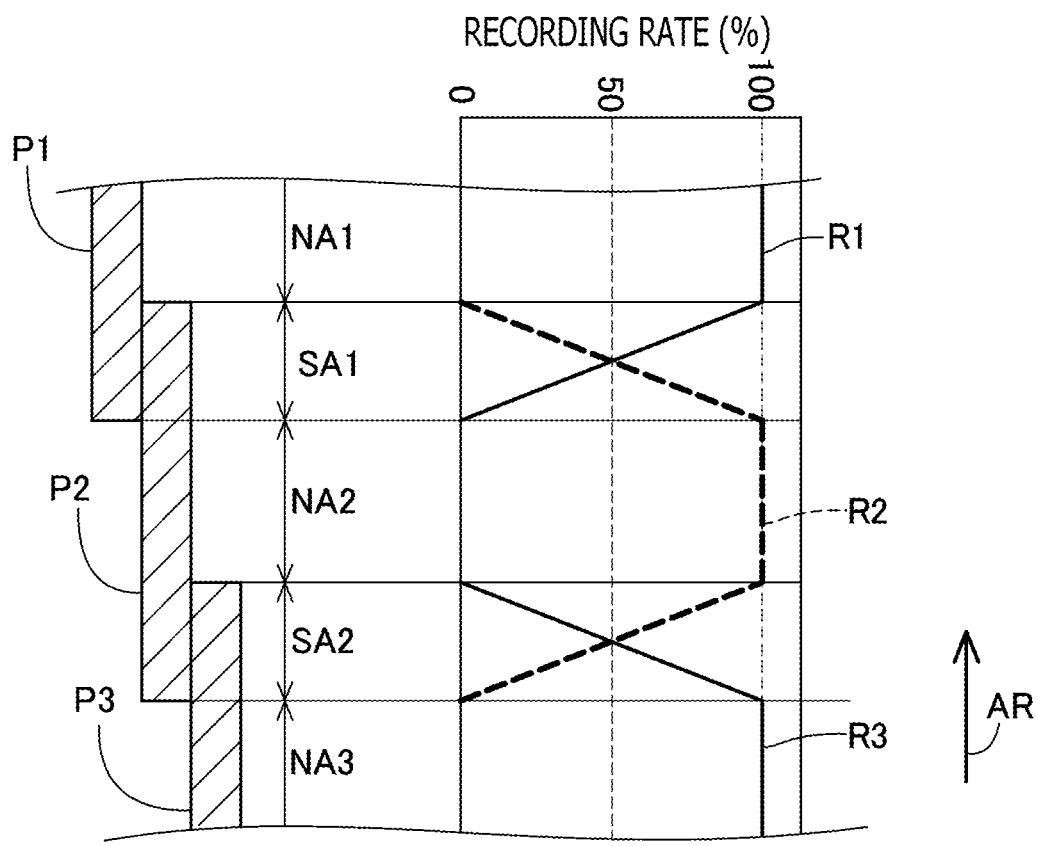
FIG. 8B shows a recording rate in partial printing at each head position, with respect to a position in a conveyance direction, in the illustrative embodiment according to one or more aspects of the present disclosure.

When determining that the target raster line is located in the overlap area SA (S210: Yes), CPU 210 obtains separation pattern data PD corresponding to the target raster line (S215). FIG. 8A shows the separation pattern data PD. Further, FIG. 8B shows respective recording rates of the partial printing operations SP at the head positions P1 to P3. As shown in FIG. 8A, the separation pattern data PD is binary data having a value for each pixel of the target raster line. The value "0" for a pixel in the separation pattern data PD represents that a dot corresponding to the pixel should be formed in the target partial printing. The value "1" for a pixel in the separation pattern data PD represents that a dot corresponding to the pixel should be formed in the partial printing SP following the target partial printing.

Here, the recording rates R1, R2, and R3 in FIG. 8B are recording rates in the partial printing operations SP1, SP2, and SP3 at the head positions P1, P2, and P3, respectively. FIG. 8B shows each of the recording rates R1 to R3 with respect to the position in the conveyance direction AR. In a range of the one-pass area NA1 (see FIG. 5) in the conveyance direction AR, the recording rate R1 is 100%. Likewise, in a range of the one-pass area NA2 (see FIG. 5) in the conveyance direction AR, the recording rate R2 is 100%. Further, likewise, in a range of the one-pass area NA3 (see FIG. 5) in the conveyance direction AR, the recording rate R3 is 100%.

In a range of the overlap area SA1 (see FIG. 5) in the conveyance direction AR, the recording rate R1 decreases linearly as going toward the upstream side (i.e., a lower side in FIG. 8B) in the conveyance direction AR. In the range of the overlap area SA1 (see FIG. 5) in the conveyance direction AR, the recording rate R2 decreases linearly as going toward the downstream side (i.e., an upper side in FIG. 8B) in the conveyance direction AR. In the range of the overlap area SA1 (see FIG. 5) in the conveyance direction AR, the sum of the recording rates R1 and R2 is 100%. The same applies to the recording rates R2 and R3 in a range of the overlap area SA2 (see FIG. 5) in the conveyance direction AR.

The separation pattern data PD is generated in such a manner as to achieve the aforementioned recording rates depending on the position in the conveyance direction AR in each overlap area SA.

In S220, the CPU 210 stores the dot data (which may be referred to as the "target dot data") generated for the target raster line in accordance with the separation pattern data PD, separately into an output buffer and a primary storage buffer. Specifically, among the target dot data, data representing the dots to be formed in the target partial printing is stored into the output buffer, and data representing the dots to be formed in the partial printing SP following the target partial printing is stored into the primary storage buffer.

When the target raster line is not located in the overlap area SA (S210: No), all the dots corresponding to the plurality of pixels included in the target raster line should be formed in the target partial printing. Accordingly, in this case, in S225, the CPU 210 stores the target dot data into the output buffer.

In S230, the CPU 210 determines whether each of all the raster lines RL for the target partial printing has been processed as the target raster line. For instance, in a case where the partial printing SP1 to be performed at the head position P1 in FIG. 5 is the target partial printing, when the raster line RL3, which is located upstream of any other raster lines RL corresponding to the head position P1 in the conveyance direction AR, is the target raster line, it is determined that all the raster lines RL for the target partial printing have been processed (S230: Yes).

When all the raster lines RL for the target partial printing have been processed (S230: Yes), the dot data for the target partial printing is stored in the output buffer at this point of time. Therefore, in this case, in S235, the CPU 210 outputs the dot data for the target partial printing to the printing mechanism 100 as pass data. At that time, control data, which indicates the conveyance distance for the sheet conveyance T to be performed after the target partial printing, is added to the pass data to be output. The conveyance distance for the sheet conveyance T to be performed after the target partial printing has already been determined in the aforementioned overlap area setting process of S204.

In S240, the CPU 210 deletes the pass data from the output buffer and stores a copy of the data stored in the primary storage buffer into the output buffer. For instance, at a point of time when the raster line RL3 as the last raster line RL corresponding to the head position P1 in FIG. 5 has been processed, raster lines RL in the overlap area SA1 among the plurality of raster lines RL corresponding to the head position P2 have already been processed. Among raster data corresponding to these processed raster lines RL, data to be used for the partial printing SP2 to be performed at the head position P2 has been stored in the primary storage buffer. In S240, these pieces of data stored in the primary storage buffer are copied to the output buffer.

When determining that there is an unprocessed raster line RL for the target partial printing (S230: No), the CPU 210 goes to S245 without executing any of the steps S235 and S240.

In S245, the CPU 210 determines whether each of all the raster lines RL in the target image RI has been processed as the target raster line. When determining that there is an unprocessed raster line RL (S245: No), the CPU 210 goes back to S200 and selects an unprocessed raster line RL as the target raster line. When determining that all the raster lines have been processed (S245: Yes), the CPU 210 terminates the pass data output process.

Referring to FIGS. 9A and 9B, a further explanation will be provided of the print image PI to be printed on the sheet S in the illustrative embodiment described above.

FIGS. 9A and 9B show examples of the target image RI and the print image PI, respectively, with respect to a photograph area. More specifically, FIG. 9A illustrates a part of the photograph area for showing the photograph PO, in the target image RI. In FIG. 9A, a plurality of rectangles indicate a plurality of pixels PX included in the target image RI. A raster line RL at a central portion in the conveyance direction AR, among a plurality of raster lines RL extending along the main scanning direction in FIG. 9A, is the raster line RL3 shown in FIG. 5. In the photograph area shown in FIG. 9A, a portion, which includes the raster line RL3 and raster lines RL located downstream of the raster line RL3 in the conveyance direction AR, will be defined as a downstream portion DP1. In the photograph area shown in FIG. 9A, a portion, which includes raster lines RL located upstream of the raster line RL3 in the conveyance direction AR, will be defined as an upstream portion UP1. The downstream portion DP1 is adjacent to a downstream end of the upstream portion UP1 in the conveyance direction AR.

FIG. 9B shows a part of the print image PI that corresponds to the photograph area shown in FIG. 9A. The print image PI is formed by a plurality of dots DT. Among the plurality of dots DT in FIG. 9A, dots corresponding to the downstream portion DP1 shown in FIG. 9A will be referred as "downstream dots DD1," and dots corresponding to the upstream portion UP1 shown in FIG. 9A will be referred to as "upstream dots UD1."

Here, a plurality of pixels PX forming the photograph PO in FIG. 9A include neutral color pixels MP that represent neutral colors different from white and black (see FIG. 9A). As illustrated in FIG. 9B, the part of the print image PI that corresponds to the photograph PO includes the overlap area SA1 where the dots are formed in both the partial printing SP1 performed at the head position P1 and the partial printing SP2 performed at the head position P2 (see S340 in FIG. 7). As described above, the overlap area SA1 is, for instance, an area of six raster lines RL. Nonetheless, in FIG. 9B, the overlap area SA1 is shown as an area of two raster lines RL for the sake of simplified illustration.

Therefore, the plurality of dots located in the overlap area SA1 among the downstream dots DD1 include dots formed in the partial printing SP1 and dots formed in the partial printing SP2. The dots formed in the partial printing SP1 are represented by black circles in FIG. 9B. The dots formed in the partial printing SP2 are represented by black squares in FIG. 9B. In FIG. 9B, white circles indicate positions where no dots are formed among positions corresponding to the plurality of pixels of the target image RI.

A plurality of dots that are not located in the overlap area SA1, among the downstream dots DD1, are dots (black circles) formed in the partial printing SP1. All the upstream dots UD1 are dots (black squares) formed in the partial printing SP2.

Here, when the overlap area SA1 is set, the nozzle interval NT is set as a target value of a distance between an end-dot formation position DLa of the plurality of downstream dots DD1 and an end-dot formation position ULa of the plurality of upstream dots UD1. The nozzle interval NT is substantially equal to a distance in the conveyance direction AR between any two dots, which are adjacent to each other in the conveyance direction AR, of a plurality of dots to be formed in a single partial printing operation SP. This is because, as described above, the nozzle interval NT is a distance in the conveyance direction AR between any two nozzles NZ, which are adjacent to each other in the conveyance direction AR, of the plurality of nozzles NZ included in each nozzle row (see FIG. 3). The end-dot formation position DLa of the downstream dots DD1 is a position in the conveyance direction AR where a plurality of dots should be formed that are arranged along the main scanning direction at a most upstream side in the conveyance direction AR among the plurality of downstream dots DD1. The end-dot formation position ULa of the upstream dots UD1 is a position in the conveyance direction AR where a plurality of dots should be formed that are arranged along the main scanning direction at a most downstream side in the conveyance direction AR among the plurality of upstream dots UD1. Specifically, the target value of the distance between the end-dot formation position DLa and the end-dot formation position ULa is set to the nozzle interval NT, by setting to the second distance (D−H) the conveyance distance for the sheet conveyance T1 that is performed immediately after the partial printing SP1 (see S350 in FIG. 7).

Figures 10A, 10B:
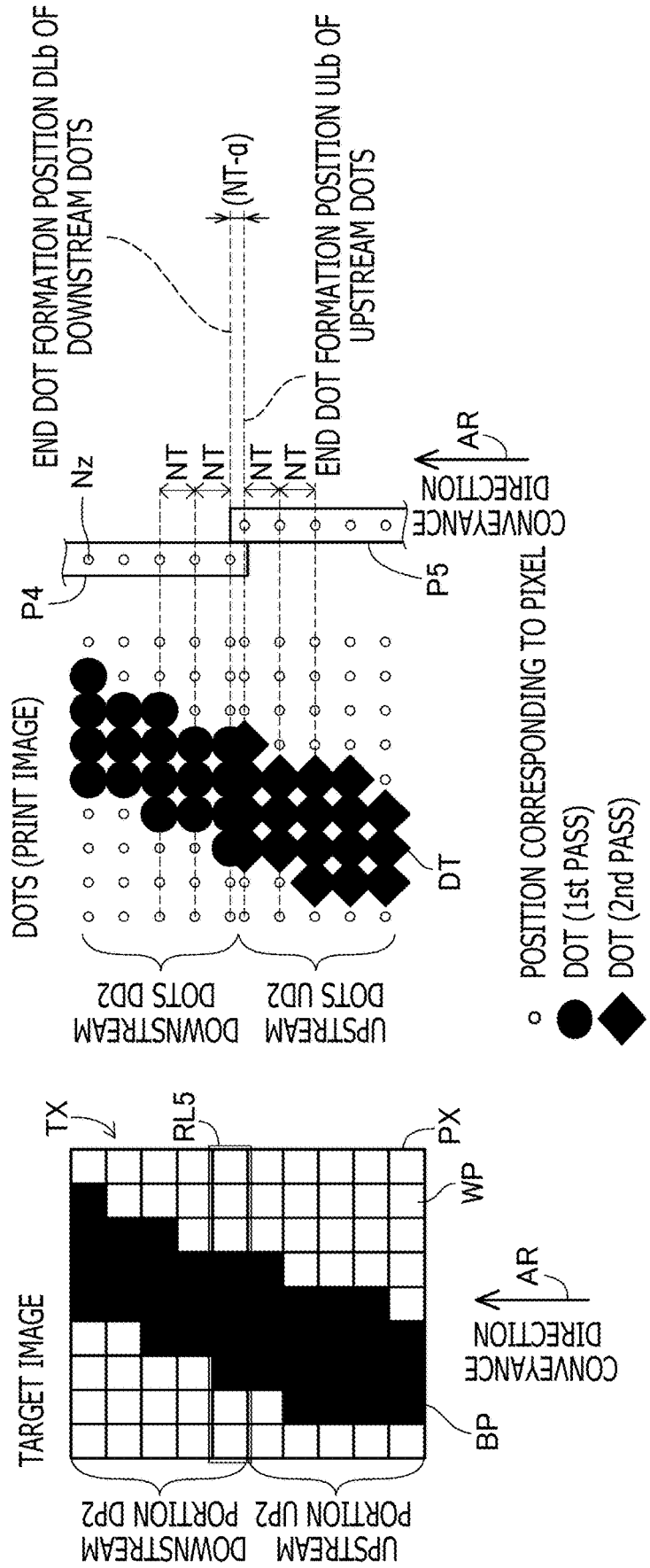
FIG. 10A shows a part of a text area in the target image, in the illustrative embodiment according to one or more aspects of the present disclosure.
FIG. 10B shows a part of the print image that corresponds to the text area shown in FIG. 10A, in the illustrative embodiment according to one or more aspects of the present disclosure.

FIGS. 10A and 10B show examples of the target image RI and the print image PI, respectively, with respect to a text area. More specifically, FIG. 10A shows a part of the text area for showing a text TX in the target image RI. In FIG. 10A, a plurality of rectangles indicate a plurality of pixels PX included in the target image RI, in the same manner as in FIG. 9A. A raster line RL at a central portion in the conveyance direction AR, among a plurality of raster lines RL extending along the main scanning direction in FIG. 10A, is the raster line RL5 shown in FIG. 5. In the text area shown in FIG. 10A, a portion, which includes the raster line RL5 and raster lines RL located downstream of the raster line RL5 in the conveyance direction AR, will be defined as a downstream portion DP2. In the text area shown in FIG. 10A, a portion, which includes raster lines RL located upstream of the raster line RL5 in the conveyance direction AR, will be defined as an upstream portion UP2. The downstream portion DP2 is adjacent to a downstream end of the upstream portion UP2 in the conveyance direction AR.

FIG. 10B shows a part of the print image PI that corresponds to the text area shown in FIG. 10A. Among the plurality of dots DT in FIG. 10A, dots corresponding to the downstream portion DP2 shown in FIG. 10A will be referred as "downstream dots DD2," and dots corresponding to the upstream portion UP2 shown in FIG. 10A will be referred to as "upstream dots UD2."

Here, the plurality of pixels PX forming the text TX in FIG. 10A include only white pixels WP and black pixels BP (see FIG. 10B). Therefore, the part of the print image PI that corresponds to the text area does not include an overlap area SA (see S320 in FIG. 7).

Hence, all the downstream dots DD2 are formed in the partial printing SP4 performed at the head position P4. All the upstream dots UD2 are formed in the partial printing SP5 performed at the head position P5. The dots formed in the partial printing SP4 are represented by black circles in FIG. 10B. The dots formed in the partial printing SP5 are represented by black squares in FIG. 10B. In the same manner as in FIG. 9B, white circles in FIG. 10B indicate positions where no dots are formed among positions corresponding to the plurality of pixels of the target image RI.

Here, when no overlap area SA is set, a value (NT−α), which is shorter than the nozzle interval NT by the adjustment length α, is set as a target value of a distance between an end-dot formation position DLb of the plurality of downstream dots DD2 and an end-dot formation position ULb of the plurality of upstream dots UD2. The end-dot formation position DLb of the downstream dots DD2 is a position in the conveyance direction AR where a plurality of dots should be formed that are arranged along the main scanning direction at a most upstream side in the conveyance direction AR among the plurality of downstream dots DD2. The end-dot formation position ULb of the upstream dots UD2 is a position in the conveyance direction AR where a plurality of dots should be formed that are arranged along the main scanning direction at a most downstream side in the conveyance direction AR among the plurality of upstream dots UD2. Specifically, the target value of the distance between the end-dot formation position DLb and the end-dot formation position ULb is set to the value (NT−α), by setting to the first distance (D−α) the conveyance distance for the sheet conveyance T4 that is performed immediately after the partial printing SP4 (see S330 in FIG. 7).

According to the illustrative embodiment described above, the CPU 210 obtains the RGB image data as the target image data (S10 and S20 in FIG. 4) and analyzes the target image data to determine whether the target image RI satisfies a particular condition (S300 and S310 in FIG. 7). In the illustrative embodiment, as shown in S310 (see FIG. 7), the particular condition is satisfied when the plurality of pixels in a candidate overlap area include only at least one of white pixel(s) and black pixel(s).

When the particular condition is satisfied (S310: Yes, in FIG. 7), the CPU 210 causes the printing mechanism 100 to perform the partial printing SP4 at the head position P4 (see FIG. 10B), in such a manner as to form the plurality of downstream dots DD2 (see FIG. 10B) corresponding to the downstream portion DP2 (see FIG. 10A) of the target image RI and not to form the plurality of upstream dots UD2 (see FIG. 10B) corresponding to the upstream portion UP2 (see FIG. 10A) of the target image RI (see FIG. 10B, and S320 in FIG. 7). Further, when the particular condition is satisfied, the CPU 210 causes the printing mechanism 100 to perform sub scanning (i.e., the sheet conveyance T4 as shown in FIG. 5) over the first distance (D−α), after the partial printing SP4 at the head position P4 (see FIG. 10B) and before the partial printing SP5 at the head position P5 (see FIG. 10B) (see S330 in FIG. 7). Further, when the particular condition is satisfied, the CPU 210 causes the printing mechanism 100 to perform the partial printing SP5 in such a manner as to form the plurality of upstream dots UD2 and not to form the plurality of downstream dots DD2. Namely, in this case, as shown in FIGS. 10A and 10B, an overlap area where dots are formed in both the partial printing SP4 and the partial printing SP5 is not set. As a result, the conveyance distance for the sheet conveyance T4 is made longer than when an overlap area is set. Thereby, it is possible to reduce the number of partial printing operations SP for printing the print image PI and suppress reduction in the printing speed.

Figure 11:
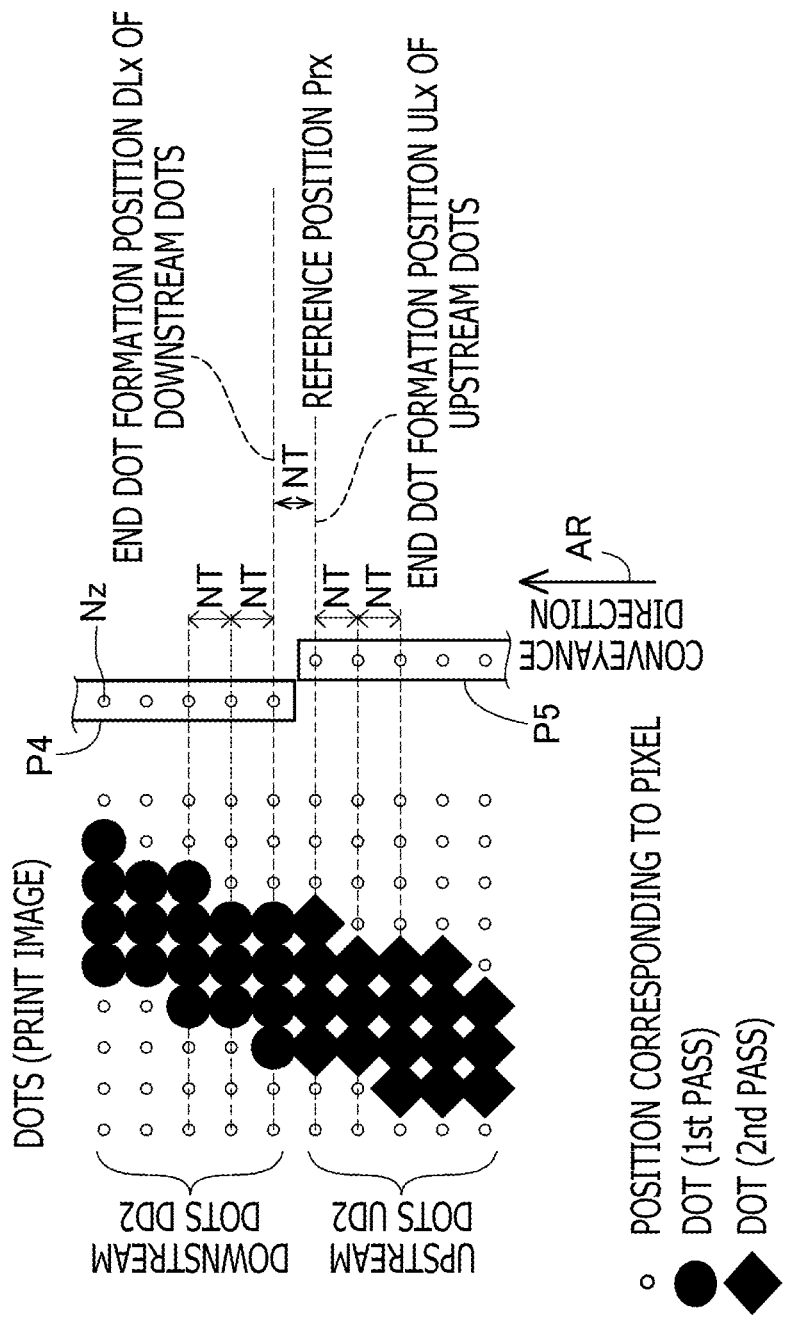
FIG. 11 shows a part of a print image that corresponds to the text area shown in FIG. 10A, in a comparative example.

Here, referring to a comparative example, an explanation will be provided of the significance of setting the conveyance distance for the sheet conveyance T4 to the first distance (D−α) when the particular condition is satisfied. FIG. 11 shows an example of a print image in the comparative example. More specifically, FIG. 11 shows a print image when the conveyance distance for the sheet conveyance T4 is set to the nozzle length D to print the text area of the target image RI that is shown in FIG. 10A. In this case, the nozzle interval NT is set as the target value of the distance between an end-dot formation position DLx of the plurality of downstream dots DD2 and an end-dot formation position ULx of the plurality of upstream dots UD2. The end-dot formation position ULx of the plurality of upstream dots UD2 is an ideal dot formation position. Therefore, the end-dot formation position ULx may be referred to as the "reference position Prx" (see FIG. 11). The nozzle interval NT may be referred to as the "reference interval."

In actual printing, there is variation in the conveyance distance for the sheet conveyance T4. Therefore, an actual value of the distance (i.e., an actual distance) between the end-dot formation position DLx of the plurality of downstream dots DD2 and the end-dot formation position ULx of the plurality of upstream dots UD2 may be larger than the target value of the distance therebetween. In the comparative example, the target value of the distance is the nozzle interval NT. Hence, the actual distance may be larger than the nozzle interval NT. In this case, the distance between upstream end dots of the plurality of downstream dots DD2 and downstream end dots of the plurality of upstream dots UD2 might be so excessively large that a white streak appears.

In contrast, in the illustrative embodiment, the target value of the distance between the end-dot formation position DLb and the end-dot formation position ULb is the value (NT−a) smaller than the nozzle interval NT. In this case, even though the actual distance is larger than the target value (NT−α) due to the variation in the conveyance distance for the sheet conveyance T4, the distance between the upstream end dots of the plurality of downstream dots DD2 and the downstream end dots of the plurality of upstream dots UD2 is prevented from being excessively large. Thereby, it is possible to suppress appearance of a white streak.

In the illustrative embodiment, the value (NT−α) is the target value of the distance between the end-dot formation position DLb of the plurality of downstream dots DD2 and the end-dot formation position ULb of the plurality of upstream dots UD2. Therefore, compared with the comparative example, an overlap between the upstream end dots of the plurality of downstream dots DD2 and the downstream end dots of the plurality of upstream dots of UD2 is more likely to be larger in the conveyance direction AR. In addition, due to the variation in the conveyance distance for the sheet conveyance T4, the actual distance between the end-dot formation position DLb of the plurality of downstream dots DD2 and the end-dot formation position ULb of the plurality of upstream dots UD2 may be even smaller than the target value (NT−α). In this case, the overlap between the upstream end dots of the plurality of downstream dots DD2 and the downstream end dots of the plurality of upstream dots UD2 may be even larger. However, in the illustrative embodiment, when the particular condition is satisfied, black is the color to be represented by the upstream end dots of the plurality of downstream dots DD2 and the downstream end dots of the plurality of upstream dots UD2. Since black is the deepest color, even if the overlap between the upstream end dots of the plurality of downstream dots DD2 and the downstream end dots of the plurality of upstream dots UD2 is larger in the conveyance direction AR, the overlap does not stand out conspicuously as a streak of a deeper color (i.e., a so-called black streak).

As understood from the above description, according to the illustrative embodiment, the first distance (D−α), which is the conveyance distance for the sheet conveyance T4, is determined such that the downstream end dots of the plurality of upstream dots UD2 are formed at the end-dot formation position DLb that is located downstream (at an upper side in FIGS. 10A and 10B) of the reference position Prx (see FIG. 11) in the conveyance direction AR. Therefore, it is possible to suppress appearance of a white streak without setting an overlap area between the upstream end dots of the plurality of downstream dots DD2 and the downstream end dots of the plurality of upstream dots UD2. Consequently, it is possible to suppress both the reduction in the printing speed and the appearance of the white streak.

Further, in the illustrative embodiment, when the particular condition is not satisfied (S310: No, in FIG. 7), the CPU 210 causes the printing mechanism 100 to perform the partial printing SP1 at the head position P1 to form at least a part of the plurality of downstream dots DD1 (see FIG. 9B) corresponding to the downstream portion DP1 (see FIG. 9A) of the target image RI (see FIG. 9B, S340 in FIG. 7). Furthermore, when the particular condition is not satisfied, the CPU 210 causes the printing mechanism 100 to perform the sub scanning (i.e., the sheet conveyance T1, see FIG. 5) over the second distance (D−H) after the partial printing SP1 and before the partial printing SP2 at the head position P2 (see FIG. 9B) (S350 in FIG. 7). Moreover, when the particular condition is not satisfied, the CPU 210 causes the printing mechanism 100 to perform the partial printing SP2 to form the plurality of upstream dots UD1.

Here, the second distance (D−H), which is the conveyance distance for the sheet conveyance T1 when the particular condition is not satisfied, is set in such a manner that the distance between the end-dot formation position DLa of the plurality of downstream dots DD1 and the end-dot formation position ULa of the plurality of upstream dots is the nozzle interval NT, as shown in FIG. 9B. The end-dot formation position ULa of the plurality of upstream dots UD1 is an ideal dot formation position. Therefore, the end-dot formation position ULa may be referred to as the "reference position Pra" (see FIG. 9B). The end dot formation position ULa (i.e., the reference position Pra) is located upstream (i.e., at a lower side in FIG. 9B) of a target position Pt (see FIG. 9B) in the conveyance direction AR. The target position Pt is such a position that the distance between the upstream end dots of the plurality of downstream dots DD1 and the downstream end dots of the plurality of upstream dots UD1 is the value (NT−α).

Thus, the second distance, which is the conveyance distance for the sheet conveyance T when the particular condition is not satisfied, is determined such that the downstream end dots of the plurality of upstream dots UD1 are formed at a position (in the illustrative embodiment, the reference position Pra) upstream of the target position Pt in the conveyance direction AR. As described above, the target position Pt is such a position that the distance between the upstream end dots of the plurality of downstream dots DD1 and the downstream end dots of the plurality of upstream dots UD1 is the value (NT−α). If the second distance is set in such a manner that the distance between the upstream end dots of the plurality of downstream dots DD1 and the downstream end dots of the plurality of upstream dots UD1 is the value (NT−α), a black streak might appear conspicuously due to an overlap between the upstream end dots of the plurality of downstream dots DD1 and the downstream end dots of the plurality of upstream dots UD1. When the particular condition is not satisfied, colors represented by the upstream end dots of the plurality of downstream dots DD1 and the downstream end dots of the plurality of upstream dots UD1 contain a color different from black. Therefore, if an excessive overlap occurs between the upstream end dots of the plurality of downstream dots DD1 and the downstream end dots of the plurality of upstream dots UD1, actual colors represented due to the excessive overlap will be deeper than originally-intended colors to be represented by the upstream end dots of the plurality of downstream dots DD1 and the downstream end dots of the plurality of upstream dots UD1, thereby causing the appearance of the conspicuous black streak.

It may be said that, in the illustrative embodiment, the particular condition (i.e., the condition that a plurality of pixels in a candidate overlap area include only at least one of white pixel(s) and black pixel(s)) is such a condition that a black streak does not appear conspicuously even if the upstream end dots of the plurality of downstream dots DD1 (or DD2) overlap the downstream end dots of the plurality of upstream dots UD1 (or UD2). The above condition for preventing the appearance of the conspicuous black streak is satisfied when an index (e.g., a density difference), which relates to a difference between a color represented when the upstream end dots of the plurality of downstream dots DD1 (or DD2) and the downstream end dots of the plurality of upstream dots UD1 (or UD2) overlap each other and another color represented when those dots do not overlap each other, is equal to or less than a reference value.

As understood from the above description, according to the illustrative embodiment, when the particular condition is satisfied, it is possible to suppress both the reduction in the printing speed and deterioration of image quality. Further, when the particular condition is not satisfied, it is possible to suppress appearance of a black streak.

Further, according to the illustrative embodiment, the CPU 210 determines whether the particular condition is satisfied, by analyzing partial data corresponding to the upstream end dots of the plurality of downstream dots DD1 (or DD2), i.e., partial data representing an image in each candidate overlap area, among the target image data (S300 and S310 in FIG. 7). Thus, it is possible to directly and appropriately determine whether the particular condition is satisfied, by analyzing data of each portion in which an amount (length) of an overlap between end dots in the conveyance direction AR may change due to variations in the conveyance distance for the sheet conveyance T.

As mentioned above, even if other dots are formed to overlap a portion of black that is the deepest color, the density of the portion is not easily changed. Therefore, even though the upstream end dots of the plurality of downstream dots DD2 and the downstream end dots of the plurality of upstream dots UD2 overlap each other in the black portion, the density of the black portion is as unlikely to change as when those end dots do not overlap each other. Hence, in the illustrative embodiment, the CPU 210 determines that the particular condition is satisfied when the partial data representing an image in a candidate overlap area includes only at least one of black pixel data and white pixel data (S300 and S310 in FIG. 7). Thus, it is possible to appropriately determine whether a conspicuous black streak appears when the upstream end dots of the plurality of downstream dots DD1 (or DD2) overlap the downstream end dots of the plurality of upstream dots UD1 (or UD2).

Further, in the illustrative embodiment, the CPU 210 determines whether the particular condition is satisfied, by analyzing RGB image data that represents the color of each pixel using an RGB value, which is a multi-gradation value having a larger number of gradations (e.g., 256 gradations) than the number of degrees (e.g., 3 degrees or 4 degrees) for the dot formation state represented by the dot data (S310 in FIG. 7). For instance, when analyzing the dot data, there may be a case in which it is impossible to determine whether the color represented by a dot is black or gray lighter than black. This is because the color represented by the black dot is not limited to black only, but may also be gray. In the illustrative embodiment, the RGB image data before converted into dot data is analyzed. Therefore, it is possible to accurately determine whether the particular condition is satisfied.

Further, in the illustrative embodiment, when the particular condition is not satisfied, the CPU 210 determines the conveyance distance for the sheet conveyance T to the second distance (D−H) that is shorter than the first distance (D−α) in the conveyance direction AR (S350 in FIG. 7). Then, as shown in FIG. 9B, for instance, CPU 210 causes the printing mechanism 100 to form a plurality of dots that include some, but not all, of the upstream end dots, among the plurality of downstream dots DD1, and not to form the other dots of the plurality of downstream dots DD1, in the partial printing SP1 performed at the head position P1. The CPU 210 causes the printing mechanism 100 to form a plurality of dots that have not been formed in the partial printing SP1, among the plurality of downstream dots DD1, and to also form the plurality of upstream dots UD1, in the partial printing SP2 performed at the head position P2. In other words, when the particular condition is not satisfied, the overlap area SA1 is set, and the dots in the overlap area SA1 among the plurality of downstream dots DD1 are formed separately in the partial printing SP1 and the partial printing SP2.

If an overlap area SA is not set when the particular condition is not satisfied, for instance, the distance between the upstream end dots of the plurality of downstream dots DD1 and the downstream end dots of the plurality of upstream dots UD1 in the conveyance direction AR may be excessively large or small due to the variations in the conveyance distance for the sheet conveyance T. In this case, a white streak or a black streak as described above may appear. In the illustrative embodiment, when the particular condition is not satisfied, an overlap area SA is set. Thereby, it is possible to suppress the appearance of the white streak or the black streak. This is because, in the overlap area SA, dots on a single raster line RL are formed separately in two partial printing operations SP, and therefore, all the dots on the single raster line RL are prevented from shifting in the same manner relative to all dots on the other raster lines RL. As a result, when the particular condition is not satisfied, it is possible to suppress the appearance of the white streak or the black streak in a portion where the upstream end dots of the plurality of downstream dots DD1 and the downstream end dots of the plurality of upstream dots UD1 are formed, in the image to be printed.

Further, in the illustrative embodiment, when the sheet S is genuine paper (S40: Yes, in FIG. 4), the CPU 210 determines whether the particular condition is satisfied, using a first criterion. Further, when the sheet S is different from genuine paper (S40: No, in FIG. 4), the CPU 210 determines whether the particular condition is satisfied, using a second criterion. As a result, it is possible to appropriately determine whether the particular condition is satisfied, by using different criteria depending on the printing medium.

Specifically, in printing in the high speed mode, when the sheet S is genuine paper (S40: Yes, in FIG. 4), the CPU 210 sets pixels having an RGB value of (0, 0, 0) and pixels having an RGB value of (1, 1, 1) as black pixels (S50, in FIG. 4), and determines whether the particular condition is satisfied. Further, when the sheet S is different from genuine paper (S40: No, in FIG. 4), the CPU 210 sets only pixels having an RGB value of (0, 0, 0) as black pixels (S60, in FIG. 4), and determines whether the particular condition is satisfied. Thus, when a sheet is used on which a color of a printed image tends to be easily lighten, it is considered that a black streak is more likely to appear conspicuously than when genuine paper is used. Therefore, in this case, a criterion (e.g., the second criterion) is used that makes it more difficult for the particular condition to be satisfied than a criterion (e.g., the first criterion) used for printing on the genuine paper. As a result, when such a sheet that a color of an image printed thereon tends to be easily lighten is used, it is possible to suppress appearance of a conspicuous black streak in the image printed on the sheet.

Further, in the illustrative embodiment, when printing should be performed in the high quality mode (S30: Yes, in FIG. 4), the CPU 210 uses the second criterion to determine whether the particular condition is satisfied. Further, when printing should be performed in the high speed mode (S30: No), provided that genuine paper is used (S40: Yes), the CPU 210 uses the first criterion to determine whether the particular condition is satisfied. Thus, it is possible to appropriately determine whether the particular condition is satisfied, depending on the printing mode.

Specifically, in the high quality mode where printing with a higher level of image quality at a lower printing speed is required than in the high speed mode, a criterion (e.g., the second criterion) is used that makes it more difficult for the particular condition to be satisfied than a criterion (e.g., the first criterion) used for printing in the high speed mode. Thus, it is possible to further suppress appearance of a conspicuous black streak in the printed image when high quality is required rather than a high printing speed.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications may be feasible.

B. Modifications

The overlap area setting process (see FIG. 7) in the aforementioned illustrative embodiment is just an example and may be modified as appropriate. For instance, in the aforementioned illustrative embodiment, when the particular condition is not satisfied, an overlap area is set at the upstream end portion of the target partial area (S340 in FIG. 7). Instead, in another instance, an overlap area may not be set even when the particular condition is not satisfied. In this case, for example, in S350, the conveyance distance for the sheet conveyance T immediately after the target partial printing may be determined to be the nozzle length D. Alternatively, in S350, the conveyance distance for the sheet conveyance T immediately after the target partial printing may be determined to be a third distance (D–β). In this case, an adjustment amount β is set to a value (e.g., 0.1 times the nozzle interval NT) smaller than the adjustment amount α. If the conveyance distance for the sheet conveyance T is set to the third distance (D–β), a white streak is more likely to appear than when the conveyance distance for the sheet conveyance T is determined to be the first distance (D–α), but is better suppressed from appearing than when the conveyance distance for the sheet conveyance T is determined to be the nozzle length D.

In the overlap area setting process of the aforementioned illustrative embodiment, as the particular condition, a condition is employed that is satisfied when the plurality of pixels in the candidate overlap area include only at least one of black pixel(s) and white pixel(s). However, the particular condition is not limited to the above condition. For instance, another condition may be employed that is satisfied when a specific index is equal to or less than a reference value. In this case, for instance, the specific index may be an index (e.g., density, saturation, and brightness) regarding a difference between a color represented when the upstream end dots of the plurality of downstream dots DD1 (or DD2) and the downstream end dots of the plurality of upstream dots UD1 (or UD2) overlap each other and another color represented when those end dots do not overlap each other.

In another instance, to determine whether the particular condition is satisfied, it may be determined whether the plurality of pixels in the candidate overlap area include only at least one of black pixel(s), pixel(s) of an ink color (e.g., cyan or magenta) different from black, and white pixel(s). In yet another instance, it may be determined whether the plurality of pixels in the candidate overlap area include only at least one of pixel(s) of colors deeper than a specific reference density and white pixel(s).

Further, the determination as to whether the particular condition is satisfied may be made using the dot data instead of the RGB image data. In this case, for instance, it may be determined whether the dots formed in the candidate overlap area include only large black dots and whether a rate of the large black dots formed in all dot-formable positions is equal to or more than a threshold (e.g., 90%).

The pixels set as the black pixels may include other pixels in addition to the pixels having an RGB value of (0, 0, 0) and the pixels having an RGB value of (1, 1, 1). For instance, even if dots representing a particular color overlap other dots, when a color change due to the overlap is so small that a portion corresponding to the overlap is unlikely to stand out conspicuously as a deep-color streak (e.g., a black streak), pixels having the particular color may be added as the said other pixels. For instance, pixels having RGB values within a predetermined range in which the RGB values satisfies the above requirements, specifically, pixels having an RGB value of (2, 2, 2) and pixels having an RGB value of (1, 2, 2) may be added as the said other pixels.

Further, in the aforementioned illustrative embodiment, the determination as to whether the particular condition is satisfied is made based solely on the pixels in the candidate overlap area including a portion corresponding to the upstream end dots of the plurality of downstream dots DD1 (or DD2). However, for instance, instead of or together with the pixels in the candidate overlap area, the determination as to whether the particular condition is satisfied may be made based on the pixels corresponding to the downstream end dots of the plurality of upstream dots UD1 (or UD2), i.e., the pixels in a portion corresponding to the end dots to be formed in the partial printing following the target partial printing. In another instance, the CPU 210 may estimate whether colors of the pixels in the candidate overlap area are black pixels, based on pixels located downstream of the candidate overlap area in the target partial area. In this case, when estimating that the colors of the pixels in the candidate overlap area are black pixels, the CPU 210 may determine that the particular condition is satisfied.

Further, the CPU 210 may analyze the target image data and identify respective types and positions of the objects shown in the target image RI. In this case, when objects located in a candidate overlap area include only text objects, the CPU 210 may determine that the particular condition is satisfied. Meanwhile, when the objects located in the candidate overlap area include an object different from a text object, the CPU 210 may determine that the particular condition is not satisfied.

In the overlap area setting process of the aforementioned illustrative embodiment, when a sheet different from genuine paper is used, it is determined whether the particular condition is satisfied, using a criterion (e.g., the second criterion) that makes it more difficult for the particular condition to be satisfied than when genuine paper is used. However, the criterion for determining whether the particular condition is satisfied is not limited to the above one. For instance, when a printing medium is used that is different from a specific type of printing medium such as glossy paper, high quality paper, and inkjet paper, it may be determined whether the particular condition is satisfied, using a criterion that makes it more difficult for the particular condition to be satisfied than when the specific type of printing medium is used.

Further, the criterion for determining whether the particular condition is satisfied may be changed depending on a printing-related condition other than the type of sheet and the printing mode. For instance, when a temperature of the print head 110 is higher than a threshold, a viscosity of the ink is lower than when the temperature of the print head 110 is equal to or lower than the threshold. Thus, an amount of ink per dot discharged from the nozzles NZ is larger accordingly. As a result, when the temperature of the print head 110 is higher than the threshold, a density of the printed image will be higher than when the temperature of the print head 110 is equal to or lower than the threshold. Therefore, when the temperature of the print head 110 is higher than the threshold, it may be determined whether the particular condition is satisfied, using a criterion that makes it easier for the particular condition to be satisfied than when the temperature of the print head 110 is equal to or lower than the threshold.

Furthermore, the CPU 210 may always use the same criterion to determine whether the particular condition is satisfied, regardless of the sheet type and the printing mode.

Instead of the sheet S, other printing media may be employed. Examples of the usable printing media may include, but are not limited to, transparencies for OHP, CD-ROMs, DVD-ROMs, fabrics (e.g., cotton textiles and synthetic textiles), and resin cases for smartphones.

In the printing mechanism 100 of the aforementioned illustrative embodiment, the conveyor 140, as a sub scanning device, conveys the sheet S, thereby moving the sheet S relative to the print head 110 in the conveyance direction AR (i.e., the sub scanning direction). Instead, the sub scanning device may be configured to move the print head 110 relative to the statically-set sheet S in a direction opposite to the sub scanning direction, thereby achieving relative movement of the sheet S with respect to the print head 110 in the sub scanning direction. In addition, the sub scanning device may include a stage for supporting a smartphone case as a printing medium at a position to face the nozzle-formed surface 111 of the print head 110. In this case, the sub scanning device may further include a mechanism (e.g., a mechanism including a motor and a gear) for moving the stage in the sub-scanning direction.

In the aforementioned illustrative embodiment, the main scanning direction is a direction perpendicular to the conveyance direction AR (i.e., the sub scanning direction). Alternatively, the main scanning direction may be a direction that intersects diagonally with the conveyance direction AR.

In the aforementioned illustrative embodiment, a controller for performing the printing process (see FIG. 4) includes the CPU 210. However, for instance, the controller may include one or more hardware circuits (e.g., ASICs) instead of the CPU 210. In another instance, the controller may include control circuitry integrated with one or more hardware circuits and one or more CPUs. Namely, although, in the aforementioned illustrative embodiment, the printing process is realized by software (i.e., the computer program CP) being executed by the CPU 210, at least a part of the printing process may be realized by circuitry.

The printing process (see FIG. 4) may be performed by another device communicably connected with the printer 200. In this case, for instance, the said another device may be a terminal device (not shown) of the user. Further, the terminal device may be configured to operate as a printer driver by executing a driver program and control the printer 200 to perform the printing process by a part of its functions as the printer driver. Further, in this case, the terminal device may provide the printer 200 with a print job including the pass data and control data indicating the conveyance distances, thereby causing the printer 200 to perform printing.

In another instance, the printing process (see FIG. 4) may be performed by a server. In this case, the server may be configured to obtain image data from the printer 200 or a terminal device and generate a print job using the obtained image data. The server may include a plurality of computers communicably connected with each other via a network.

The following shows examples of associations between elements exemplified in the aforementioned illustrative embodiments and modifications and elements according to aspects of the present disclosure. The printer 200 may be an example of a "printer" according to aspects of the present disclosure. The printing mechanism 100 may be an example of a "print engine" according to aspects of the present disclosure. The CPU 210 may be included in a "controller" according to aspects of the present disclosure. Further, the non-volatile storage device 220 storing the computer program CP may be included in the "controller" according to aspects of the present disclosure. In other words, the "controller" according to aspects of the present disclosure may be realized by the CPU 210 executing the computer program CP stored in the non-volatile storage device 220. The non-volatile storage device 220 storing the computer program may be an example of a "non-transitory computer-readable medium storing computer-readable instructions" according to aspects of the present disclosure. The non-volatile storage device 220 storing the computer program may be an example of a "memory storing computer-readable instructions" according to aspects of the present disclosure. The print head 110 may be an example of a "print head" according to aspects of the present disclosure. The main scanning device 130 may be an example of a "main scanning device" according to aspects of the present disclosure. The conveyor 140 may be an example of a "sub scanning device" according to aspects of the present disclosure. The conveyance direction AR may be an example of a "sub scanning direction" according to aspects of the present disclosure. The genuine paper may be an example of a "first type of printing medium" according to aspects of the present disclosure. A sheet different from the genuine paper may be an example of a "second type of printing medium" according to aspects of the present disclosure. The high speed mode may be an example of a "first printing mode" according to aspects of the present disclosure. The high quality mode may be an example of a "second printing mode" according to aspects of the present disclosure. The partial printing SP1 and the partial printing SP4 may be included in examples of a "first partial printing operation" according to aspects of the present disclosure. The partial printing SP2 and the partial printing SP5 may be included in examples of a "second partial printing operation" according to aspects of the present disclosure. The downstream portion DP1 and the downstream portion DP2 may be included in examples of a "first portion" according to aspects of the present disclosure. The upstream portion UP1 and the upstream portion UP2 may be included in examples of a "second portion" according to aspects of the present disclosure. The downstream dots DD1 and the downstream dots DD2 may be included in examples of "first dots" according to aspects of the present disclosure. The upstream dots UD1 and the upstream dots UD2 may be included in examples of "second dots" according to aspects of the present disclosure. The end-dot formation position ULb may be an example of a "first target position" according to aspects of the present disclosure. The end-dot formation position ULa may be an example of a "second target position" according to aspects of the present disclosure.

What is claimed is:

1. A printer comprising:
a controller; and
a print engine comprising:
    a print head having a plurality of nozzles configured to discharge ink therefrom toward a printing medium, the plurality of nozzles being disposed in respective different positions in a sub scanning direction;
    a main scanning device configured to perform a main scanning operation to move the print head along a main scanning direction intersecting the sub scanning direction, relative to the printing medium; and
    a sub scanning device configured to perform a sub scanning operation to move the printing medium in the sub scanning direction relative to the print head,
wherein the controller is configured to:
    obtain target image data that represents a target image formed by a plurality of pixels;
    analyze the target image data and determine whether a particular condition is satisfied with respect to the target image;
    control the print engine to alternately and repeatedly perform a partial printing operation and the sub scanning operation over a plurality of times, the plurality of partial printing operations including a first partial printing operation and a second partial printing operation to be performed following the first partial printing operation, each partial printing operation being an operation in which the controller causes the print head to discharge ink from the plurality of nozzles while causing the main scanning device to perform the main scanning operation, thereby forming dots on the printing medium;
    when determining that the particular condition is satisfied, control the print engine to:
        perform the first partial printing operation to form a plurality of first dots corresponding to a first portion of the target image, without forming a plurality of second dots corresponding to a second portion of the target image, the first portion being adjacent to a downstream end of the second portion in the sub scanning direction;
        cause the sub scanning device to perform the sub scanning operation to move the printing medium over a first distance, after the first partial printing operation and before the second partial printing operation; and
        perform the second partial printing operation to form the plurality of second dots, without forming the plurality of first dots;
    when determining that the particular condition is not satisfied, control the print engine to:
        perform the first partial printing operation to form at least a part of the plurality of first dots;
        cause the sub scanning device to perform the sub scanning operation to move the printing medium over a second distance different from the first distance, after the first partial printing operation and before the second partial printing operation; and
        perform the second partial printing operation to form the plurality of second dots,
wherein the first distance is determined in such a manner that second end dots of the plurality of second dots are formed at a first target position, the second end dots are arranged along the main scanning direction at a downstream end portion of the plurality of second dots in the sub scanning direction, and the first target position is located downstream of a reference position in the sub scanning direction,
wherein the second distance is determined in such a manner that the second end dots of the plurality of second dots are formed at a second target position, and the second target position is located upstream of the first target position in the sub scanning direction,
wherein the reference position is located upstream away from first end dots of the plurality of first dots by a reference distance in the sub scanning direction, the first end dots are arranged along the main scanning direction at an upstream end portion of the plurality of first dots in the sub scanning direction, and the reference distance is an interval in the sub scanning direction between any adjacent two of a plurality of dots to be formed along the sub scanning direction in each partial printing operation, and is based on an interval in the sub scanning direction between any adjacent two of the plurality of nozzles disposed along the sub scanning direction, and
wherein the particular condition is satisfied when a specific index is equal to or less than a reference value, and the specific index is an index regarding a difference between a color represented when the first end dots overlap the second end dots and another color represented when the first end dots do not overlap the second end dots.

2. The printer according to claim 1,
wherein the controller is further configured to determine whether the particular condition is satisfied, by analyzing partial data of the target image data, the partial data representing at least one of a portion corresponding to the first end dots of the plurality of first dots in the first portion of the target image data and a portion corresponding to the second end dots of the plurality of second dots in the second portion of the target image data.

3. The printer according to claim 2,
wherein the controller is further configured to determine that the particular condition is satisfied, when the partial data includes only at least one of pixel data representing a specific ink color and pixel data representing a color corresponding to a color of the printing medium.

4. The printer according to claim 3,
wherein the pixel data representing the specific ink color is pixel data representing black, and the pixel data representing the color corresponding to a color of the printing medium is pixel data representing white.

5. The printer according to claim 1,
wherein the controller is further configured to:
    convert the target image data into dot data representing a dot formation state of each pixel, the target image data being multi-gradation data representing a color of each pixel using a multi-gradation value, the multi-gradation value having a larger number of gradations than a count of degrees for the dot formation state represented by the dot data;

control the print engine to perform the plurality of partial printing operations using the dot data; and determine whether the particular condition is satisfied, by analyzing the multi-gradation data.

6. The printer according to claim 1,
wherein the controller is further configured to, when determining that the particular condition is not satisfied, control the print engine to:
in the first partial printing operation, form a plurality of dots that include some, but not all, of the first end dots, among the plurality of first dots, without forming the other dots of the plurality of first dots;
cause the sub scanning device to perform the sub scanning operation to move the printing medium over a second distance, after the first partial printing operation and before the second partial printing operation, the second distance being shorter than the first distance in the sub scanning direction; and
in the second partial printing operation, form the said other dots of the plurality of first dots, and form the plurality of second dots.

7. The printer according to claim 1,
wherein the controller is further configured to:
identify a type of the printing medium;
when the identified type of the printing medium is a first type, determine whether the particular condition is satisfied, using a first criterion; and
when the identified type of the printing medium is a second type different from the first type, determine whether the particular condition is satisfied, using a second criterion different from the first criterion.

8. The printer according to claim 7,
wherein a color of an image to be printed on the second type of printing medium based on particular print data is paler than a color of an image to be printed on the first type of printing medium based on the particular print data, and
wherein the second criterion makes it more difficult for the particular condition to be satisfied than the first criterion.

9. The printer according to claim 1,
wherein the controller is further configured to:
control the print engine to perform printing selectively in one of a first printing mode and a second printing mode different from the first printing mode;
when printing should be performed in the first printing mode, determine whether the particular condition is satisfied, using a first criterion; and
when printing should be performed in the second printing mode, determine whether the particular condition is satisfied, using a second criterion different from the first criterion.

10. The printer according to claim 9,
wherein the second printing mode is a mode in which printing with a higher level of image quality at a lower printing speed is required than in the first printing mode, and
wherein the second criterion makes it more difficult for the particular condition to be satisfied than the first criterion.

11. The printer according to claim 1,
wherein the controller comprises:

a processor; and
a memory storing computer-readable instructions configured to, when executed by the processor, cause the controller to:
obtain the target image data;
analyze the target image data and determine whether the particular condition is satisfied with respect to the target image;
control the print engine to alternately and repeatedly perform the partial printing operation and the sub scanning operation over the plurality of times;
when determining that the particular condition is satisfied, control the print engine to:
perform the first partial printing operation to form the plurality of first dots corresponding to the first portion of the target image, without forming the plurality of second dots corresponding to the second portion of the target image;
cause the sub scanning device to perform the sub scanning operation to move the printing medium over the first distance, after the first partial printing operation and before the second partial printing operation; and
perform the second partial printing operation to form the plurality of second dots, without forming the plurality of first dots;
when determining that the particular condition is not satisfied, control the print engine to:
perform the first partial printing operation to form at least a part of the plurality of first dots;
cause the sub scanning device to perform the sub scanning operation to move the printing medium over the second distance, after the first partial printing operation and before the second partial printing operation; and
perform the second partial printing operation to form the plurality of second dots.

12. A non-transitory computer-readable medium storing computer-readable instructions executable by a processor of a printer, the printer comprising a print engine comprising:
a print head having a plurality of nozzles configured to discharge ink therefrom toward a printing medium, the plurality of nozzles being disposed in respective different positions in a sub scanning direction;
a main scanning device configured to perform a main scanning operation to move the print head along a main scanning direction intersecting the sub scanning direction, relative to the printing medium; and
a sub scanning device configured to perform a sub scanning operation to move the printing medium in the sub scanning direction relative to the print head, the instructions being configured to, when executed by the processor, cause the processor to:
obtain target image data that represents a target image formed by a plurality of pixels;
analyze the target image data and determine whether a particular condition is satisfied with respect to the target image;
control the print engine to alternately and repeatedly perform a partial printing operation and the sub scanning operation over a plurality of times, the plurality of partial printing operations including a first partial printing operation and a second partial printing operation to be performed following the first partial printing operation, each partial printing operation being an operation in which the processor causes the print head to discharge ink from the plurality of nozzles while causing the main scanning device to perform the main scanning operation, thereby forming dots on the printing medium;

when determining that the particular condition is satisfied, control the print engine to:

perform the first partial printing operation to form a plurality of first dots corresponding to a first portion of the target image, without forming a plurality of second dots corresponding to a second portion of the target image, the first portion being adjacent to a downstream end of the second portion in the sub scanning direction;

cause the sub scanning device to perform the sub scanning operation to move the printing medium over a first distance, after the first partial printing operation and before the second partial printing operation; and perform the second partial printing operation to form the plurality of second dots, without forming the plurality of first dots;

when determining that the particular condition is not satisfied, control the print engine to:

perform the first partial printing operation to form at least a part of the plurality of first dots;

cause the sub scanning device to perform the sub scanning operation to move the printing medium over a second distance different from the first distance, after the first partial printing operation and before the second partial printing operation; and perform the second partial printing operation to form the plurality of second dots, wherein the first distance is determined in such a manner that second end dots of the plurality of second dots are formed at a first target position, the second end dots are arranged along the main scanning direction at a downstream end portion of the plurality of second dots in the sub scanning direction, and the first target position is located downstream of a reference position in the sub scanning direction, wherein the second distance is determined in such a manner that the second end dots of the plurality of second dots are formed at a second target position, and the second target position is located upstream of the first target position in the sub scanning direction, wherein the reference position is located upstream away from first end dots of the plurality of first dots by a reference distance in the sub scanning direction, the first end dots are arranged along the main scanning direction at an upstream end portion of the plurality of first dots in the sub scanning direction, and the reference distance is an interval in the sub scanning direction between any adjacent two of a plurality of dots to be formed along the sub scanning direction in each partial printing operation, and is based on an interval in the sub scanning direction between any adjacent two of the plurality of nozzles disposed along the sub scanning direction, and wherein the particular condition is satisfied when a specific index is equal to or less than a reference value, and the specific index is an index regarding a difference between a color represented when the first end dots overlap the second end dots and another color represented when the first end dots do not overlap the second end dots.

13. A method implementable on a processor of a printer comprising a print engine comprising:

a print head having a plurality of nozzles configured to discharge ink therefrom toward a printing medium, the plurality of nozzles being disposed in respective different positions in a sub scanning direction;

a main scanning device configured to perform a main scanning operation to move the print head along a main scanning direction intersecting the sub scanning direction, relative to the printing medium; and a sub scanning device configured to perform a sub scanning operation to move the printing medium in the sub scanning direction relative to the print head, the method comprising:

obtaining, by the controller, target image data that represents a target image formed by a plurality of pixels;

analyzing the target image data and determine whether a particular condition is satisfied with respect to the target image;

controlling the print engine to alternately and repeatedly perform a partial printing operation and the sub scanning operation over a plurality of times, the plurality of partial printing operations including a first partial printing operation and a second partial printing operation to be performed following the first partial printing operation, each partial printing operation being an operation in which the print head discharges ink from the plurality of nozzles while the main scanning device performs the main scanning operation, thereby forming dots on the printing medium;

when determining that the particular condition is satisfied, controlling the print engine to:

perform the first partial printing operation to form a plurality of first dots corresponding to a first portion of the target image, without forming a plurality of second dots corresponding to a second portion of the target image, the first portion being adjacent to a downstream end of the second portion in the sub scanning direction;

cause the sub scanning device to perform the sub scanning operation to move the printing medium over a first distance, after the first partial printing operation and before the second partial printing operation; and perform the second partial printing operation to form the plurality of second dots, without forming the plurality of first dots;

when determining that the particular condition is not satisfied, controlling the print engine to:

perform the first partial printing operation to form at least a part of the plurality of first dots;

cause the sub scanning device to perform the sub scanning operation to move the printing medium over a second distance different from the first distance, after the first partial printing operation and before the second partial printing operation; and perform the second partial printing operation to form the plurality of second dots, wherein the first distance is determined in such a manner that second end dots of the plurality of second dots are formed at a first target position, the second end dots are arranged along the main scanning direction at a downstream end portion of the plurality of second dots in the sub scanning direction, and the first target position is located downstream of a reference position in the sub scanning direction, wherein the second distance is determined in such a manner that the second end dots of the plurality of second dots are formed at a second target position, and the second target position is located upstream of the first target position in the sub scanning direction, wherein the reference position is located upstream away from first end dots of the plurality of first dots by a reference distance in the sub scanning direction, the first end dots are arranged along the main scanning direction at an upstream end portion of the plurality of first dots in the sub scanning direction, and the reference distance is an interval in the sub scanning direction between any adjacent two of a plurality of dots to be formed along the sub scanning direction in each partial printing operation, and is based on an interval in the sub scanning direction between any adjacent two of the plurality of nozzles disposed along the sub scanning direction, and wherein the particular condition is satisfied when a specific index is equal to or less than a reference value, and the specific index is an index regarding a difference between a color represented when the first end dots overlap the second end dots and another color represented when the first end dots do not overlap the second end dots.

* * * * *